US012661745B2

(12) United States Patent
Pucel et al.

(10) Patent No.: US 12,661,745 B2
(45) Date of Patent: Jun. 23, 2026

(54) SYSTEM AND METHOD FOR AN ADJUSTABLE MACHINE APPARATUS

(71) Applicant: Aim Holdings, LLC, Temperance, MI (US)

(72) Inventors: Mark Pucel, South Lyon, MI (US); Lawrence Phillip Carter, Lambertville, MI (US); James P. Miller, Adrian, MI (US)

(73) Assignee: Aim Holdings, LLC, Temperance, MI (US)

( * ) Notice: Subject to any disclaimer, the term of this patent is extended or adjusted under 35 U.S.C. 154(b) by 711 days.

(21) Appl. No.: 17/967,036

(22) Filed: Oct. 17, 2022

(65) Prior Publication Data

US 2023/0119197 A1 Apr. 20, 2023

Related U.S. Application Data

(60) Provisional application No. 63/257,304, filed on Oct. 19, 2021.

(51) Int. Cl.
B23Q 1/01 (2006.01)
B23Q 1/25 (2006.01)

(52) U.S. Cl.
CPC ............... B23Q 1/015 (2013.01); B23Q 1/25 (2013.01)

(58) Field of Classification Search
CPC .......... B23Q 1/015; B23Q 1/25; B21D 28/04; B21D 37/08; B21D 37/14; B21D 43/105; B21D 28/24; B23K 37/0452
See application file for complete search history.

(56) References Cited

U.S. PATENT DOCUMENTS

| | | | | |
|---|---|---|---|---|
| 3,078,917 | A | | 2/1963 | Recchione |
| 3,225,636 | A | * | 12/1965 | Schott .................. B21D 28/265 |
| | | | | 269/291 |
| 7,325,581 | B2 | * | 2/2008 | Braun ................. B29C 66/8242 |
| | | | | 156/513 |
| 9,278,383 | B2 | * | 3/2016 | Fischereder ........... B21D 43/26 |
| 9,937,633 | B2 | * | 4/2018 | Schwarz ............. B29C 66/8167 |
| 11,491,524 | B2 | * | 11/2022 | Dal Cerro ............ B21D 43/105 |
| 2005/0223549 | A1 | * | 10/2005 | Braun ................. B29C 66/8242 |
| | | | | 29/799 |
| 2008/0072646 | A1 | | 3/2008 | Domschot |

(Continued)

FOREIGN PATENT DOCUMENTS

| | | |
|---|---|---|
| CN | 109514275 A | 3/2019 |
| DE | 102015122779 A1 | 6/2017 |
| JP | H09285874 A | 11/1997 |

OTHER PUBLICATIONS

Examiner's Report received by the Canadian Intellectual Property Office in regard to Canadian Patent Application No. 3,179,264 dated Apr. 11, 2024, 5 pages.

(Continued)

*Primary Examiner* — Lawrence Averick
(74) *Attorney, Agent, or Firm* — Harness, Dickey & Pierce, P.L.C.

(57) ABSTRACT

The subject disclosure relates to a machine apparatus. The machine apparatus may perform work on one or more work pieces. The machine apparatus may be augmented or reconfigured to work on a plurality of different work pieces in specific and unique configurations.

21 Claims, 20 Drawing Sheets

(56)                References Cited

U.S. PATENT DOCUMENTS

| | | | | |
|---|---|---|---|---|
| 2013/0160508 A1* | 6/2013 | Fischereder | .......... | B21D 43/26 72/6.1 |
| 2016/0052157 A1* | 2/2016 | Schwarz | ............ | B29C 65/7457 83/743 |
| 2020/0188979 A1* | 6/2020 | Dal Cerro | ............... | B21D 5/04 |

OTHER PUBLICATIONS

Office Action received by the Canadian Intellectual Property Office in regard to Canadian Patent Application No. 3,179,264 dated Sep. 2, 2025, 6 pages.
First Office Action received by the Mexican Institute of Industrial Property regarding Mexican Patent Application No. MX/a/2022/013133 dated Aug. 28, 2025, 14 pages.
Office Action received by the Japan Patent Office regarding Japenese Patent Application No. 2022-167656 dated Mar. 17, 2026, 20 pages.
Second Office Action received by the Mexican Institute of Industrial Property regarding Mexican Patent Application No. MX/a/2022/013133 dated Feb. 27, 2026, 12 pages.

* cited by examiner

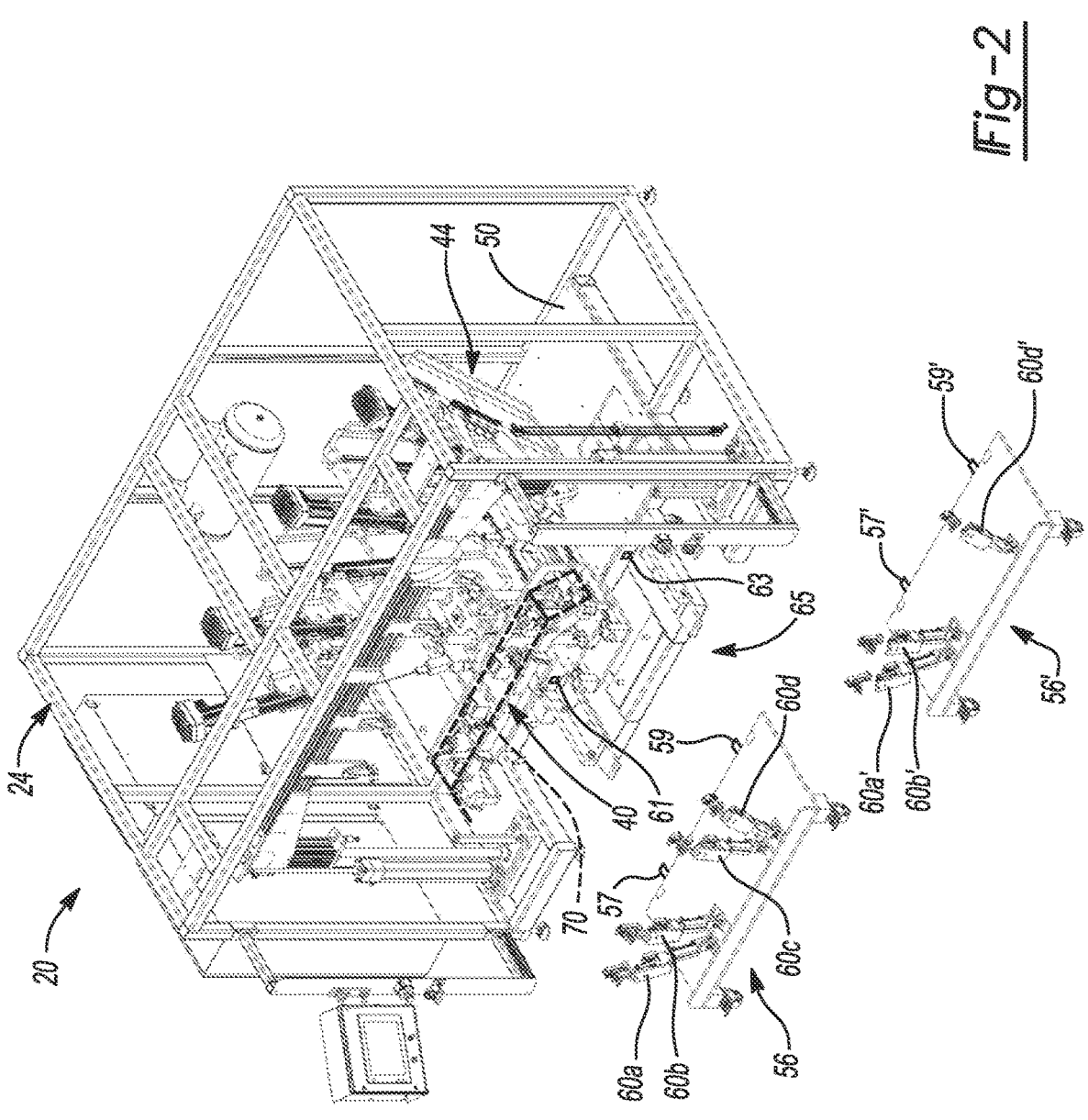
_Fig-2_

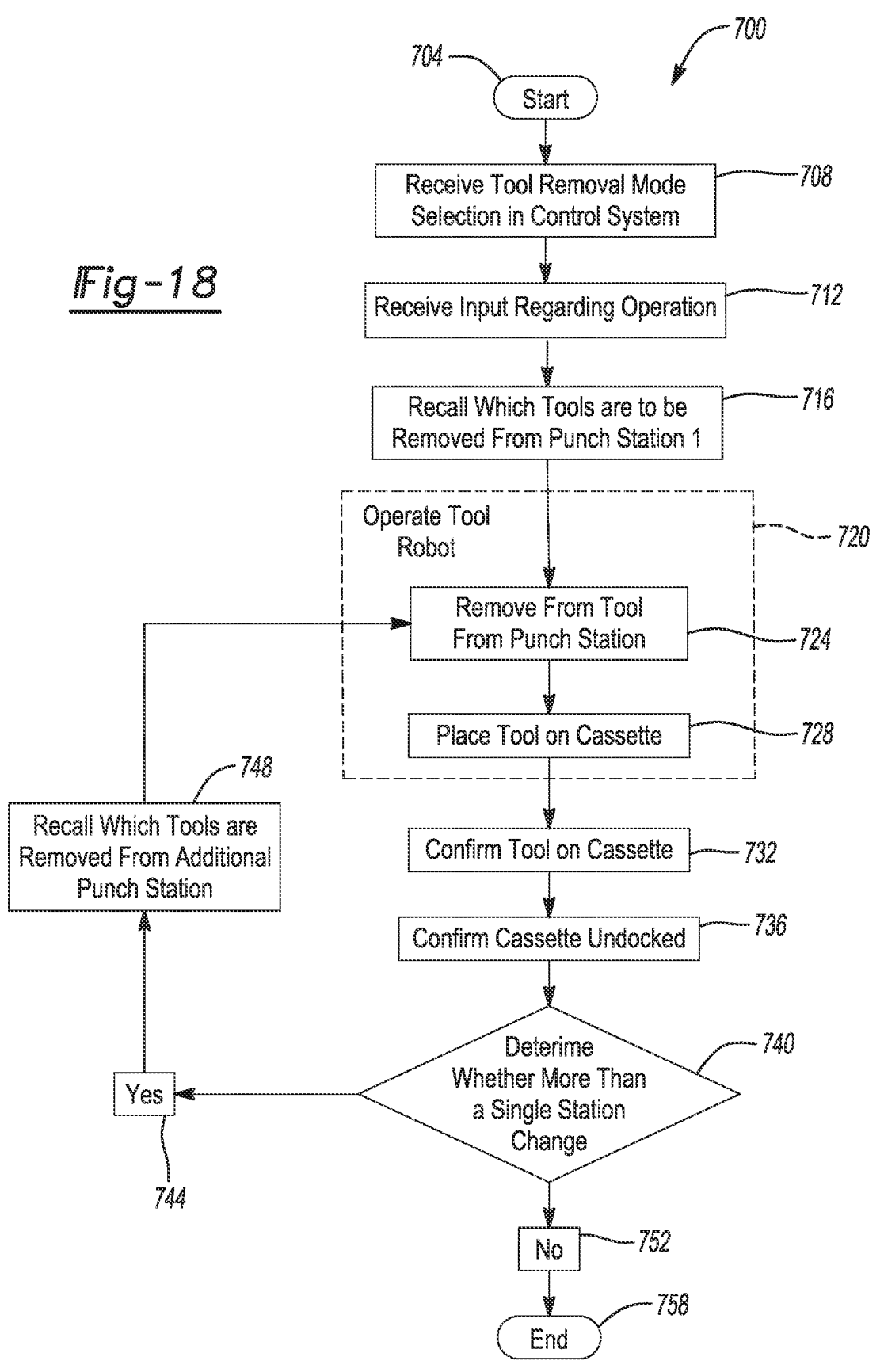

_Fig-18_

704 — Start

700

708 — Receive Tool Removal Mode Selection in Control System

712 — Receive Input Regarding Operation

716 — Recall Which Tools are to be Removed From Punch Station 1

720 — Operate Tool Robot

724 — Remove From Tool From Punch Station

728 — Place Tool on Cassette

732 — Confirm Tool on Cassette

736 — Confirm Cassette Undocked

740 — Deterime Whether More Than a Single Station Change

744 — Yes

748 — Recall Which Tools are Removed From Additional Punch Station

752 — No

758 — End

SYSTEM AND METHOD FOR AN ADJUSTABLE MACHINE APPARATUS

CROSS-REFERENCE TO RELATED APPLICATIONS

This application claims the benefit of U.S. Provisional Application No. 63/257,304, filed on Oct. 19, 2021. The entire disclosure(s) of (each of) the above application(s) is (are) incorporated herein by reference.

FIELD

The subject application relates to a machine apparatus, and particularly to a multi-station adjustable jig machine system and method for operation thereof.

BACKGROUND

This section provides background information related to the present disclosure which is not necessarily prior art.

A fixed system, such as the fixed jig system may be used to preform operations for various purposes. For example, a jig system may be used to perform various punching and welding operations in or on various portions, such a fascia of a vehicle. For example, a machine apparatus, such as a jig, may be used to punch holes in a fascia for receiving various elements. The elements and finished fascia may then be affixed to a vehicle, such as an automobile. The machine may include a fixed jig that may accept or hold a predetermined member, such as a fascia, in a selected position and orientation during a work process.

SUMMARY

This section provides a general summary of the disclosure, and is not a comprehensive disclosure of its full scope or all of its features.

A machine system may include a jig or holder assembly that may hold a work piece, such as a fascia. The fascia may be for a portion of a final assembled product, such as a bumper fascia for an automobile. The machine may include a plurality of components or tools to preform various operations on the work piece. For example, the machine may include various punching or welding tools. Further, the tools may be held by a plurality of components.

The machine may include a set of fixed tool holders and/or a set of moveable tool holders. It is understand that the machine may include a plurality of moveable tool holders and no fixed tool holders. However, in various embodiments, the machine may further include more than one workstation. Accordingly, the machine may further include a set of fixed tools at a first work station and a set of moveable tools, or at least a set of tools where at least a sub-plurality of the tools are moveable, at a second work station.

The machine may include an operation or operator station, a frame assembly, and various components to hold the tool holders in a selected position. Further, the machine may include a base and one or more movement assemblies or systems to move a tool-holding portion of the machine. The movement assembly may include one or more portions that are configured to move the tool holder to a selected position. The selected position may be based upon various parameters, such as the size of the fascia, geometry of the fascia, selected number of operations to be performed on the fascia, or the like. Nevertheless, the movement assemblies may move a selected tool holder and/or more than one tool holder to selected positions for performing operations on the fascia.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of the machine apparatus with a plurality of tool cartridges;

FIG. 18 is a flow chart for a process of removing a tool, according to various embodiments;

Corresponding reference numerals indicate corresponding parts throughout the several views of the drawings.

DETAILED DESCRIPTION

Example embodiments will now be described more fully with reference to the accompanying drawings.

Figure 1:
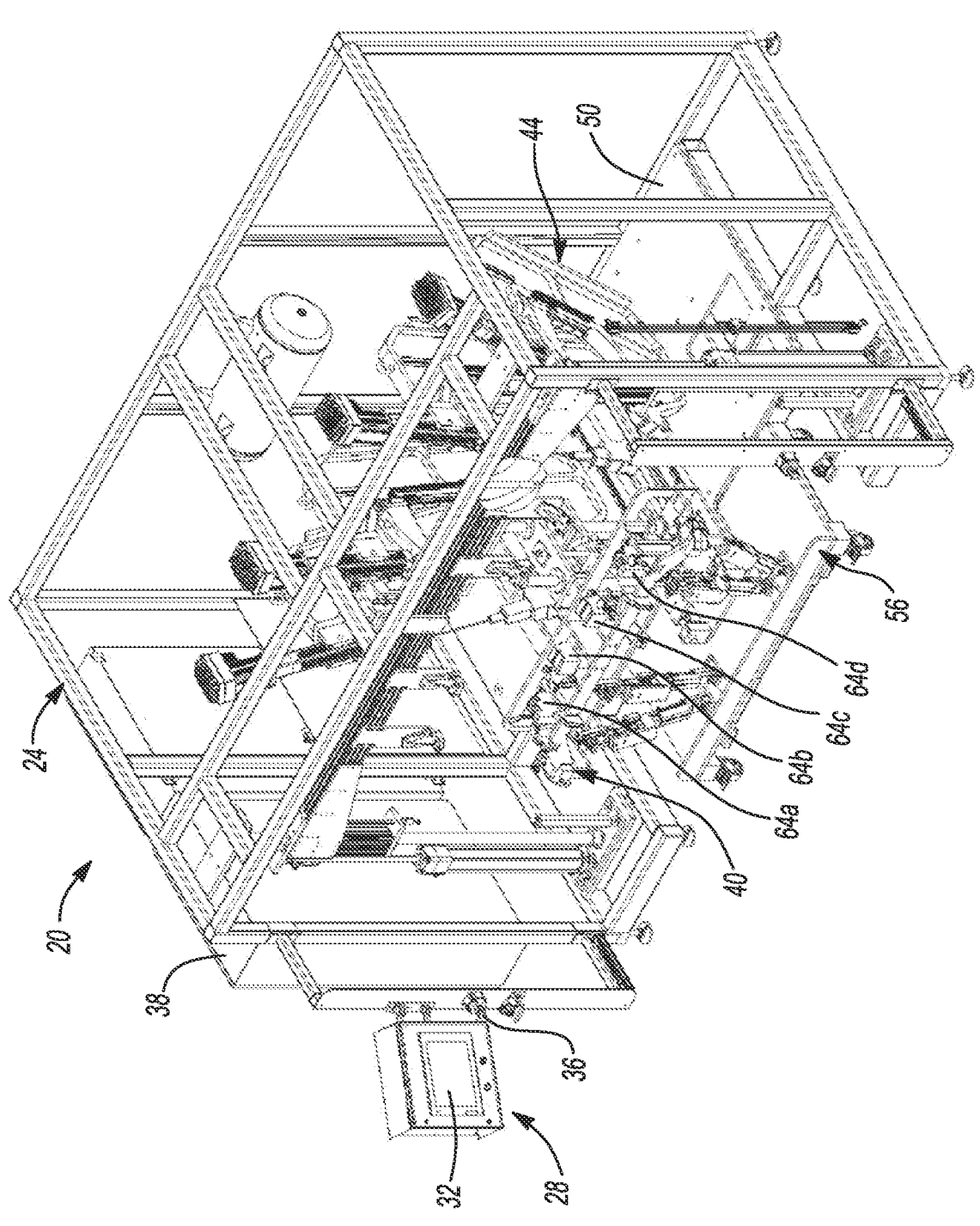
FIG. 1 is a perspective environmental view of a machine including movable tool holders, according to various embodiments.

With initial reference to FIG. 1, a machine apparatus 20 is illustrated. The machine apparatus 20 may include the various main components, such as a frame 24 that may be used to hold and support various components of the machine apparatus 20. The machine apparatus 20 may also be referred to as a machine assembly or system and a jig or jig system or apparatus. As discussed herein, the machine apparatus may include one or more stations that may be configured to more than one configuration to perform work on a workpiece. The machine apparatus may include various portions and tools, such as those included in the sonic punch and weld machine, sold by Aim Holdings LLC bda Accuworx, having a place of business at Temperance, MI, USA.

The machine apparatus 20 may include various displays and controls 28 that are provided for a user or operator to operate the machine apparatus 20. In various embodiments, the controls may include a display 32 that may also be a touch display for operation of the machine apparatus 20. In addition, one or more operation start/stop buttons and/or other manual inputs 36 may also be provided and/or provided for operation of the machine apparatus 20. Further, the displays and controls 28 may include one or more processor modules, such as a programmable logic controller. Accordingly, one or more operators may operate the machine apparatus 20 that is held or contained within the frame 24. The machine apparatus 20 may include connections for power, controls, and etc. in an electrical cabinet 38 that houses electrical and/or control components. Various storage and/or connection assemblies may be provided and/or held on the frame assembly 24. For example, a storage assembly may include various components and connections, tool bits or fixtures for the machine apparatus 20, or other appropriate portions.

The machine apparatus 20 may include various components that are generally held within the frame assembly 24, such as a jig or holding table 40. One or more tool frames 44 may also be held within the frame assembly 24 the machine apparatus 20. The tool frames 44 may include a plurality of tool frames, such as a four tool frames (each of which may be all referred to as 44 and augmented by a lower case letter). The tool frames 44 may also be referred to as "C"-frames and/or punch C-frames. The C-frames may also be referred to as tool mounting frame. In various embodiments, the C-frames may be configured to hold and/or orient a tool. The machine apparatus 20 may further include a base 50 to which the C-frames 44 are moveably fixed. The jig or table 40 may also move relative to the base 50.

One or more weld cartridges or carts 56 may be moveable relative to the frame assembly 24 and the base or floor 50. As further illustrated in FIG. 2, the weld cartridge 56 may be removed from the frame assembly 24 for various purposes. For example, the weld cartridge 56 may include a selected number of weld tools, such as four weld tools 60a-60d. Each of the weld tools 60a-60d may interact with a selected member, such as the fascia member, for performing a work operation thereon. In various embodiments, however, only three weld tools 60a', 60b', and 60d' may be included on a separate or alternative weld cartridge 56'. The separate or alternative weld cartridge 56' may also include an electrical and/or information connection 57' and/or a pneumatic connection 59' similar to those of the cart 56.

Accordingly, the machine apparatus 20 may be augmented and/or changed for various purposes to include the weld cartridge 56 or the weld cartridge 56'. For example, the machine apparatus 20 may be used to weld four portions with the cartridge 56 or weld three portions with the cartridge 56'. Further, the tool portions 60a-60d on the cartridge 56 may be oriented in a first selected position while the tool portions 60a'-60d' on the weld cartridge 56' may be oriented in alternative or different position. Accordingly, the machine apparatus 20 may be set-up for more than one geometry of a fascia by using a selected one of the weld cartridges 56, 56'. In addition, the machine apparatus 20 may be used to perform a plurality of weld operations by performing a first weld operation with a weld cartridge 56 and a second weld operation with the weld cartridge 56'. Accordingly, one skilled in the art with understand that the selection and/or order of using one or more of the weld cartridges 56, 56' may be used to perform a selected and specific weld operations on a selected work piece.

It is further understood that the tool portions 60 may be fixed relative to the base 50. Thus, the cartridges 56 are not necessary and may be omitted. Further, the cartridges may include one or more connections that connect them to the machine apparatus 20. The connections may include an electrical and/or information connection 57 and/or a pneumatic connection 59. The connections may provide power and/or control to the tool portions 60. Further, the connections may allow for transmission of information to the machine apparatus. The cart connections 57, 59 may mate or connect with frame connections 61, 63 that are included with the machine apparatus 20, such as at a cart receiving area 65. For example, each of the carts 56, 56' may transmit an identity and/or configuration for performing work on the workpiece. Example information may include number and/or location of welding operations. The information may also include configuration information for other operation of the machine apparatus 20, such as positions of the C-frames 44, as discussed herein. The information may also be transferred with other portions such as a radio frequency identification member (RFID) associated with the carts 56, 56', user input entry, etc.

Moreover, it is understood that the holding table 40 may be used to hold and position a fascia in a selected position or orientation. For example, with reference to FIG. 3, the holding table 40 may include one or more bumper or resting members 64a-64d. However, any appropriate number of holding members 64 may be used to hold a selected work piece. Further, a bumper fascia 70 is merely exemplary of a work piece, also be referred to as a workpiece herein, that may be used during operation of the machine apparatus 20. It is understood that any appropriate portion may be worked on with the machine apparatus 20, and the bumper fascia 70 is merely exemplary. Moreover, the tools move and/or operated with the machine apparatus 20 may be operated on any selected material of a bumper fascia. In various embodiments, a bumper fascia may be formed with a selected polymer. Nevertheless, it is understood by one skilled in the art that the machine apparatus 20 may move and/or be used to operate tools to work on work pieces that are not formed of a polymer, such as a metal, metal alloy, amorphous materials, crystal materials, or any appropriate material. Accordingly, the machine apparatus 20 may be used for working on various materials and/or work pieces, as it is understood by one skilled in the art.

Figure 3:
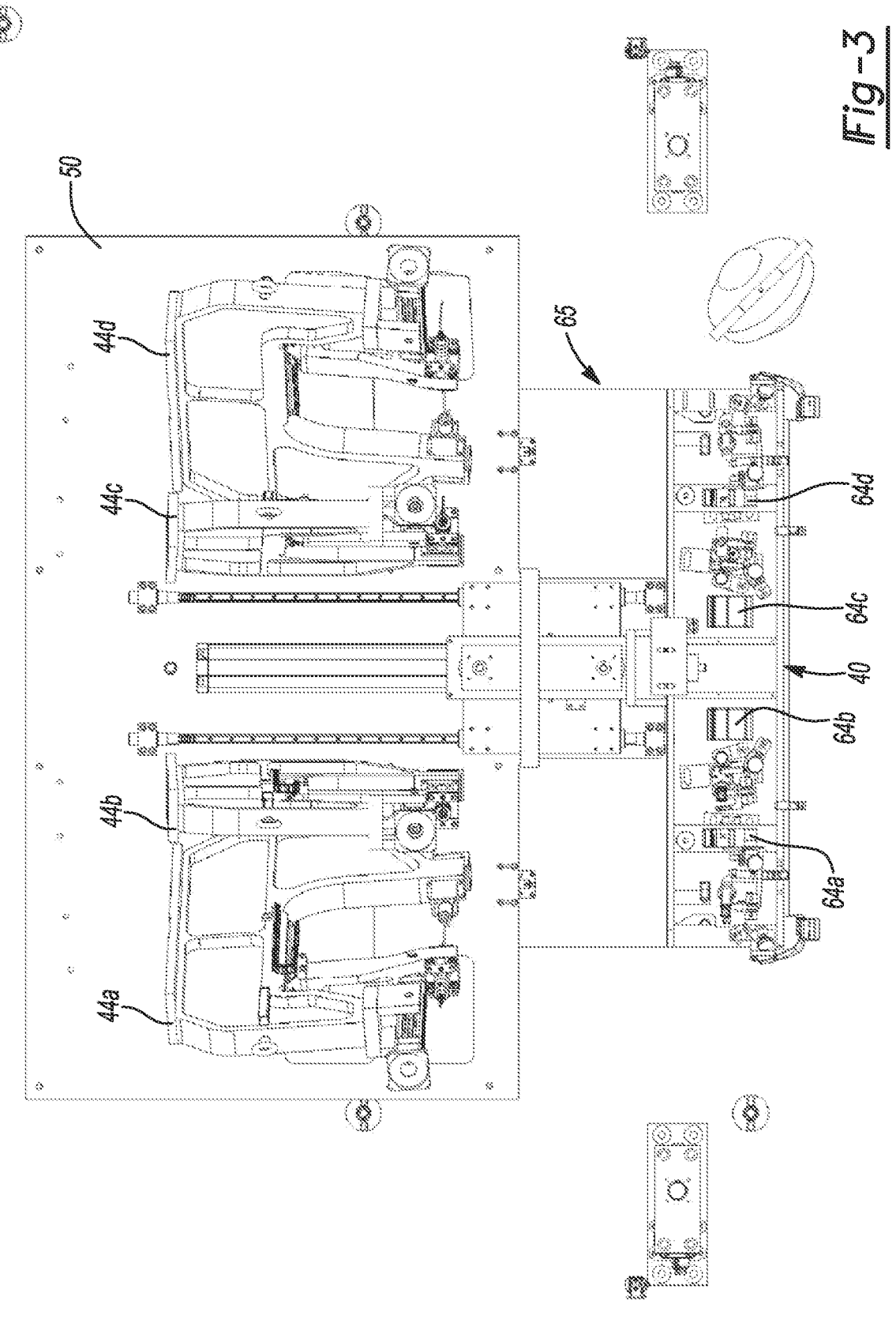
FIG. 3 is a in detail top plane view of the machine apparatus of FIG. 1.

With continued reference to FIGS. 1-3, the work piece may be any appropriate work piece, such as the bumper fascia 70, as discussed above. The bumper fascia 70, illustrated in (illustrated in phantom) is positioned on the jig or table 40 for movement between the tools in the cart 56 and the tools in the C-frames or tool fixtures 44. The jig 40 may move from relative to the cart 56, which may be also referred to as Station 1, to the C-frames 44 which may also be referred to as Station 2. Therefore, the fascia 70 may be moved between the two stations by and within the machine apparatus 20 in a substantially automatic manner. The fascia 70, therefore, may be moved between the two stations for at least two operations to be performed on the fascia 70. As discussed above the cart 56 may include one or more of the tool portion 60 to perform an operation on the fascia 70. Further, one or more of the C-frames 44 may include a tool, such as a punch or sonic punch, for operation on the fascia as well.

Figure 4:
FIG. 4 is a rear perspective view of the machine apparatus of FIG. 1.
Figure 5:
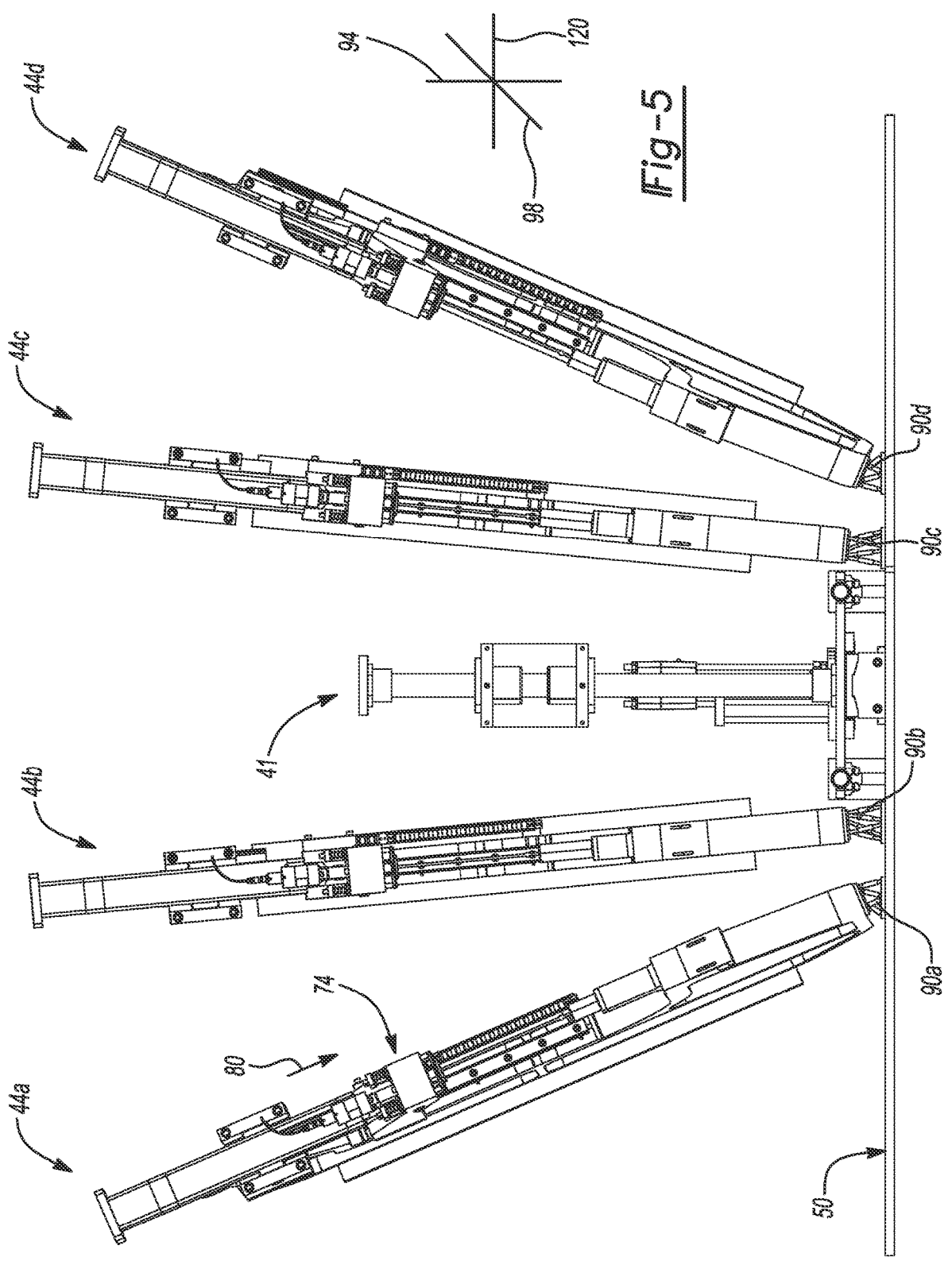
FIG. 5 is a detail front elevation view of a portion of machine apparatus of FIG. 1, according to various embodiments.

Turning reference to FIGS. 4 and 5, the C-frames 44 may include any appropriate number of C-frames 44, as an example four C-frames 44a, 44b, 44c, and 44d are illustrated. Each of the C-frames 44 may hold or orient a tool, such as a sonic punch or punch assembly 74. The tool 74 may be connected to the C-frame 44 with an appropriate connection, such as a quick change feature. The quick change may be provided both any of the tool 74 and/or die. This will allow for the punch and die units to be installed quickly onto the C-frames 44 while ensuring proper punch to die clearance.

The sonic punch assembly 74 may be moved relative to a jig or holding portion 76 of each of the C-frames 44 for operation to be performed on a fascia 70. As discussed above, the fascia 70 may be positioned on the table 40. The table 40 may be moved to the second position near or adjacent to the C-frames 44 to allow for operation of the tools held by the C-frames 44. Accordingly, the punches 74 may move generally in the direction of arrow 80 to perform an operation on the fascia 70 when it is positioned in the selected position. One skilled in the art will understand that the table 40 may be moved relative to the C-frames 44 in an appropriate manner in positioning thereof may be confirmed of various sensors. Appropriate motors may be used to move the fascia relative to the C-frames 44 on the table 40, as is generally understood by one skilled in the art.

The C-frames 44 may be positioned in a selected orientation, as illustrated in FIG. 5 to perform a cutting or work on the work piece, such as the fascia 70. As discussed above, the punch 74 may punch the fascia that is held by the table 40 when positioned relative to the C-frames 44. The C-frames 44 orient the tools in 74 relative to the fascia 70 to allow for work to be performed on the fascia 70. In this manner, the C-frames 44 may hold the tools in the position selected that the C-frames 44. In addition, while holding the tools, the C-frames 44 may move relative to the base 50, table 40, and/or each other as discussed herein.

Figure 6:
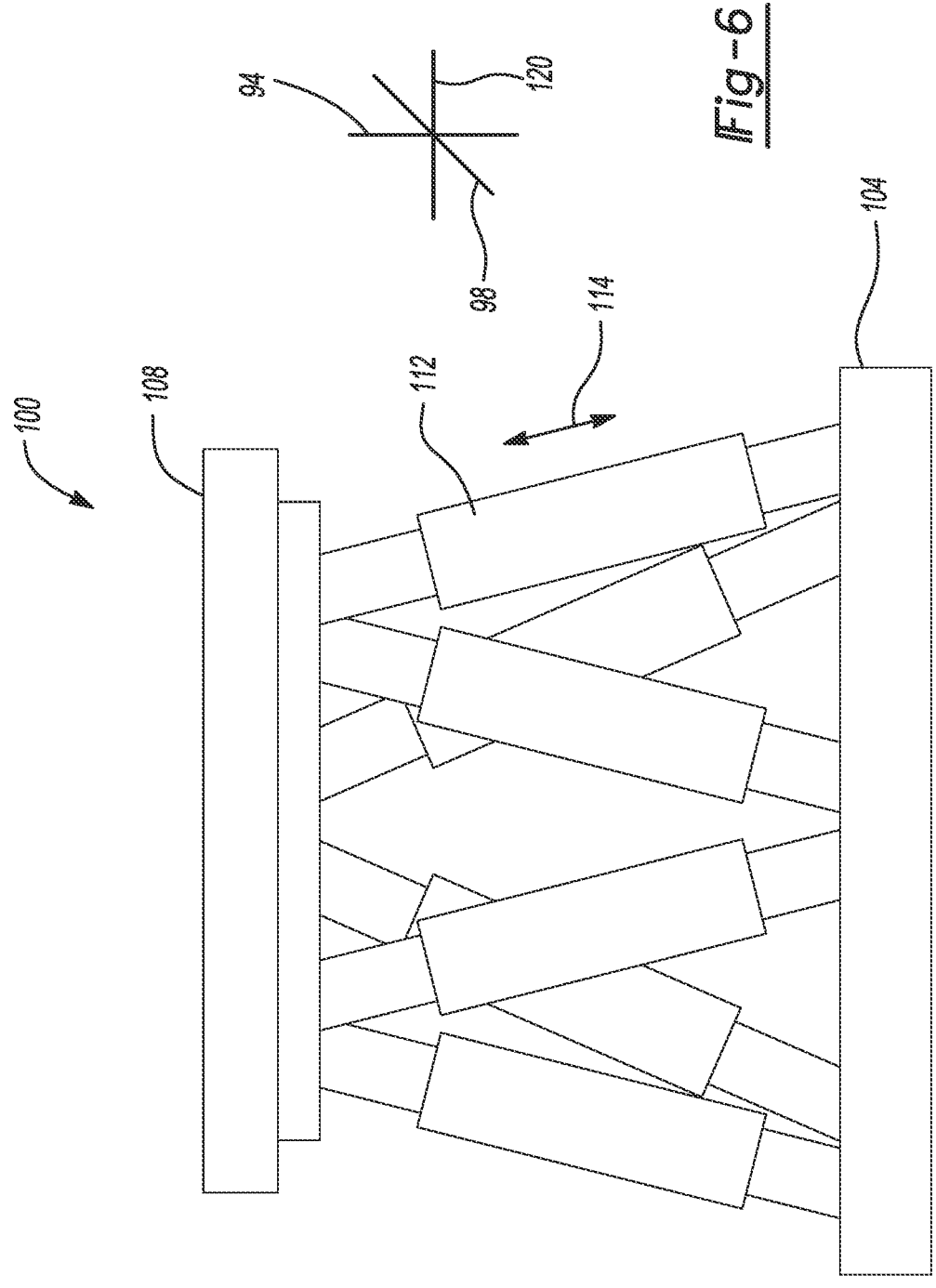
FIG. 6 is a movement system.
Figure 7A:
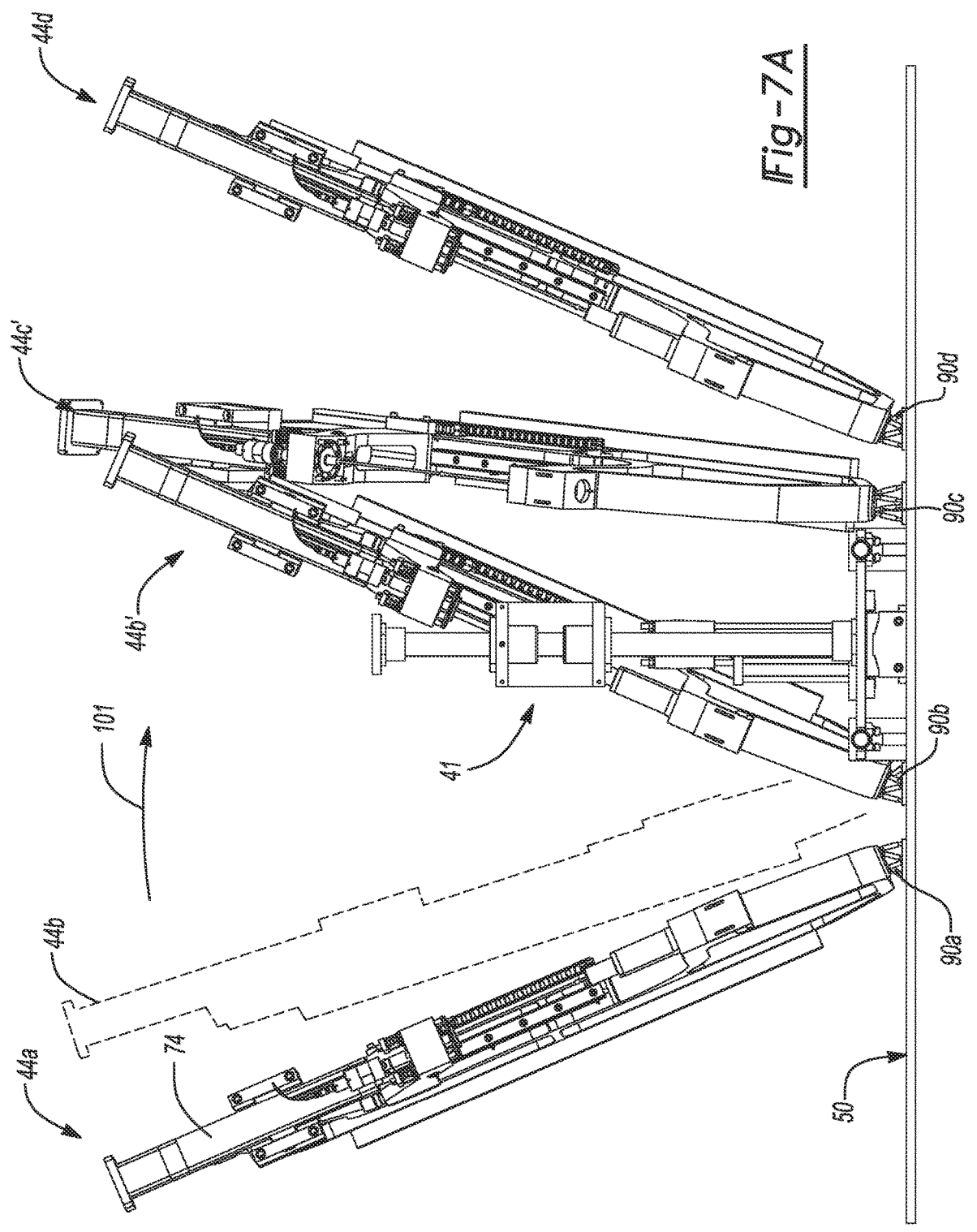
FIG. 7A is a front elevation view of an alternative configuration of the machine apparatus of FIG. 1, according to various embodiments.
Figure 7B:
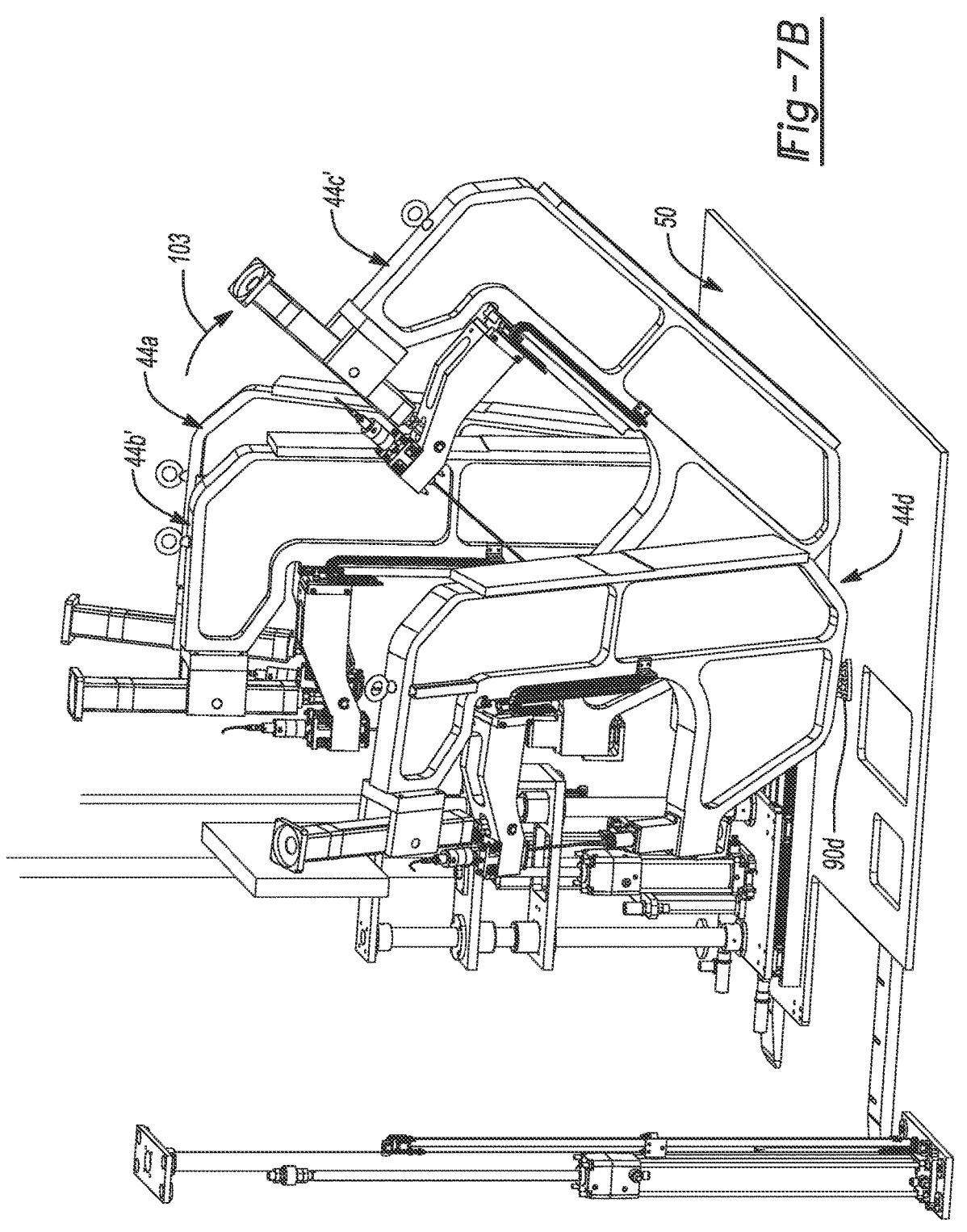
FIG. 7B is a rear perspective view of the machine apparatus of FIG. 7A.

While the C-frames 44 are illustrated in a selected position or orientation, as illustrated in FIGS. 1-5, the C-frames 44 may move with a selected movement mechanism or assembly 90 illustrated in FIG. 6. In various embodiments, for example, the movement mechanism 90 may include an individual movement mechanism for each of the C-frames 44. Each C-frame 44 may be connected to an individual movement mechanism 90. Thus, as illustrated in FIGS. 7A and 7B each of the C-frames 44a-44d has an individual movement mechanisms 90a, 90b, 90c, and 90d.

Each individual movement mechanisms 90a, 90b, 90c, and 90d may be provided between each of the respective C frames 44a-44d and the base or floor plate 50. Each of the movement mechanisms 90a-90d may include an appropriate rigidity and strength to hold the C-frames 44 in a selected position relative to the base or floor 50. For example, as illustrated in FIGS. 4 and 5 the C-frames 44 may be held in a first orientation by the movement mechanisms 90a-90d. In various embodiments, however, the movement mechanisms 90a-90d may move one or more of the C frames 44a-44d relative to the frame assembly 24, including one or more of the other C-frame 44 and/or the base 50 as illustrated in FIG. 7B.

The movement systems 90 may be any appropriate movement system that is able to support the mass of each of these selected C-frames 44 and move them in a selected orientation relative to one another. For example, an assembly of one or more motors may be used to move the C-frames 44 relative to one another and/or to a selected position, such as generally along a first axis 94 and a second axis 98. The two axes may be an X and Y-axis that allow for orthogonal movement or Cartesian coordinate movement of the C-frames 44. In various embodiments, however, the movement structures 90 may include a six degree of freedom movement structure or construct assembly such as a hexapod 100, as illustrated in FIG. 6.

The hexapod 100 may be the movement structure 90 that includes a base 104 to connect to the base or floor 50 and a platform 108 to connect to the C-frame 44. Movement structures or members 112 may interconnect the base 104 and the platform 108. The hexapod 100 may include the high load hexapods, such as the H-850, H-855, or H-845 hexapod sold by Physik Instrumente "PI" GmbH and Co. having a place of business in Karlsruhe, Germany. In the hexapod 100, each of the members 112 may move reciprocally in the direction of the double headed arrow 114. The amount of movement of each of the members 112 moves the platform 108 relative to the base 104 a selected amount. This allows the platforms 108 to be raised, lowered, tilted, and rotated relative to the base 104. Accordingly, any portion fixed to the platform 108 will likewise move in the similar or same manner. The amount of movement may depend on the range of motion of the members 112. Also, the movement of the members 112 may be controlled by a selected controller with a processor (also referred to as a processor module or similar) that is designed and/or configurable to execute instructions.

It is understood, however, that any appropriate movement system 90 may be operated and/or moved to move the selected C-frames 44 and the hexapod 100 is merely exemplary. Nevertheless, the hexapod 100 allows the platform 108 to translate in three axes, including the axis 94 and 98 but also in a third axis 120. Moreover, the platform 108 may also rotate around each of the axes 94, 98, and 120. Accordingly, the C-frames 44 may have at least 6 degrees of freedom in a selected range of motion or movement relative to the base 50 and/or each other.

The movement structures 90a-90d may be operated substantially independently of one another such that each of the C-frames 44a-44d may move independently of one another. This also allows for a selective amount of motion or movement relative to one another. Therefore, the movement structures 90a-90d allow for the respective C-frames 44 to move relative to one another for positioning the respective tools 74 carried by the C frames 44a-44d relative to the table 40.

For example, as illustrated in FIG. 5, each of the C-frames may be positioned at a first absolute position, such as relative to a table support structure 41 (also referred to herein exemplarily as a central support or a workpiece table fixture) and/or relative to each other. Further, the C-frames 44 may be positioned at an absolute position relative to the base or floor 50. As illustrated in FIG. 5, for example, each of the C-frames 44 may be positioned in the selected first or initial position for operation on the fascia 70 positioned on the table 40.

With continuing reference to FIG. 5 and in additional reference to FIGS. 7A and 7B, the machine apparatus 20 may be altered. As discussed above the cart 56 may have selected tools positioned or fixed thereto and may be moved relative to the frame assembly 24. In various embodiments, the tool assemblies 60 may be welding assemblies that weld portions relative to the fascia 70 at selected positions. As illustrated in FIG. 2, the positions may include three tool assemblies 60a', 60b' and 60d' on the cart 56'. Accordingly, the C-frames 44 may be oriented to form holes or punches in the fascia 70 in a similar configuration.

As illustrated in FIGS. 7A and 7B, the C-frames 44 may be oriented such as the first C-frame 44a and 44d are angled away from the central support 41 while the C-frame 44b is positioned near or in line with the central support 41. Thus, the respective tools 74 carried by each of the respective C-frames 44 may be positioned at selected orientations or positions of the fascia 70 carried by the table 40 to form work on the fascia, such as punching holes in the fascia. It may be selected in this configuration, for example, only the tools 74 on the C-frames 44b, 44c, and 44d may be operated.

The C-frames may be positioned to perform work on the workpiece 70 in a specific location, such as punching holes in the fascia 70. The holes formed on the fascia 70 would then be aligned with the respective tools 60a', 60b' and 60d' that are positioned on the cart 56'. The C-frames 44 may, therefore, be moved to selected positions for performing work on the workpiece 70 to match or be aligned with other tools or work steps. For example, forming holes aligned with the tool portions 60a', 60b' and 60d' of the cart 56'.

The C-frames 44 are generally not removed from machine apparatus 20, once installed. Rather the C-frames 44 may be moved with the movement assemblies 90. Thus, the machine apparatus 20 may be configured for more than one configuration of the C-frames 44 without assembly and/or disassembly of the machine apparatus 20 once installed.

For example, with reference to FIGS. 5, 7A, and 7B, the movement structures 90a and 90d may hold a respective C-frames 40a and 40d relative to the floor 50 in a selected position. The selected position of the C-frames 40a and 40d may be maintained for two different configurations of all of the C-frames 44. Thus, the C-frames 40a and 40d remain in the same relative position in FIG. 5 and FIGS. 7A and 7B.

The movement assembly 90b, however, may be operated to move the C-frame 44b. The C-frame 44b may be moved from the initial or one selected position, as illustrated in FIG. 5 and in phantom in FIG. 7A. The movement may be to a second or moved position C-frame 44b', such as near or relative to the central support 41, as illustrated in FIG. 7A generally at least in a linear direction along arrow 101 and/or may include rotation.

The movement assembly 90c may move the C-frame 44c from the initial or first position as illustrated in FIG. 5. The C-frame 44c may be moved to a second position C-frame 44c' as illustrated in FIG. 7B. The movement may be linear and or rotational generally in the direction of arrow 103. The second position may be out of the way, such as tilting it away from the support structure 41 and/or table 40, such that it does not interfere and/or to be moved out of the way of operation of the machine apparatus 20 for operation on the selected fascia 70. As noted above, the respective movement assemblies 90 may be operated to move the C-frames 44 in the selected positions for selected operations on the fascia, or performing work on the appropriate work piece.

Accordingly, as illustrated above, the machine apparatus 20 may be oriented in at least in between two configurations of the C-frames 44 for working on selected work pieces. The work pieces may include bumper fascia. The work performed may include forming holes for and mounting brackets for sensors configured to be used in parking, autonomous driving, and other road or object sensing situations of for an automobile. The multiple configurations allow for work to be performed at different locations to accommodates different and varied bumper fascia, such as geometries, sizes, materials, etc.

Further, the machine apparatus 20 may include a plurality of the carts 56 that may be positioned relative to the frame assembly 24 for performing different or various work processes on different and selected fascia. For example, the four tools 60a-60d may operate on a first fascia that has a selected length or configuration. The four C-frames 44a-44d may also be positioned to perform work on the first fascia. A second or alternative fascia may include a geometry or shape that only requires or is selected to include three work positions. Therefore, the cart 56' may be positioned relative to the frame assembly 24 to perform work at three positions and the C-frames 44 may be moved to orient the tools 74 associated or connected with the C-frames 44 to a position for working on the alternative or second fascia. Therefore, the machine apparatus 20 may be operated and configured to move the C-frames 44 without removing and replacing any one of the C-frames 44 for working on a plurality of different work pieces, such as different fascia, in different positions and/or orientations.

Figures 8, 9:
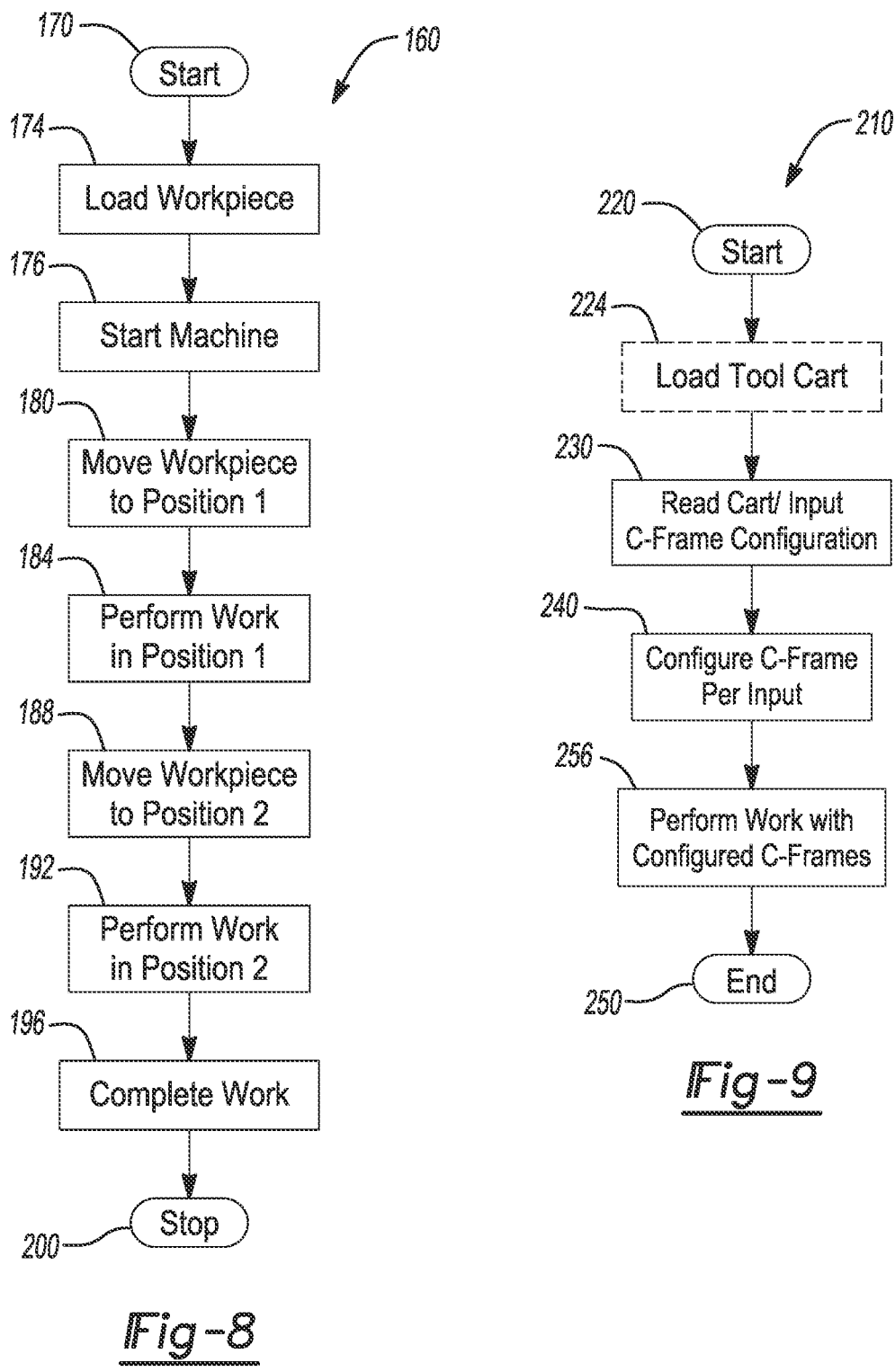
FIG. 8 is a flow chart of operation of a machine apparatus, according to various embodiments.
FIG. 9 is a flow chart of operation of a machine apparatus, according to various embodiments.

The machine apparatus 20 may be operated according to various processes, such as a process 160 illustrated in FIG. 8. Generally, the process begin in start block 170 and the operator may load a work piece in block 174. The operator may then initiate operation of the machine assembly in block 176. In various embodiments, the machine apparatus 20 may verify that a work piece is present, such as through various sensors including light sensors, pressure sensors, or the like. The work piece may then be moved to position or station one (Station 1) in block 180, such as by moving and lifting the table 40, as discussed above. Work may then be performed in Station 1 in block 184. As discussed above the work performed may include operating the tools 74 held by the C-frames 44. The tools 74 may include the appropriate tools, such as punches or sonic punches that may punch or form holes in the work piece. For example, holes may be punched with sonic punches in a bumper fascia. Nevertheless, the work performed at Station 1 may be any appropriate work, and punches held by C-frames 44 is merely exemplary.

After the work is performed in Station 1, the work piece may be moved to position or station two (Station 2) in block 188. As discussed above, the worktable 40 may move the work piece to the Station 2, such as relative to the tools 60 held by the cart 56. The operator may have performed various steps such as ensuring brackets or members are positioned relative to the tools of the cart 56 for operation at the second position. The machine apparatus 20 may operate with additional input from the operator, such as positioning the brackets, or may be operated independently thereof. Nevertheless, in various embodiments, the operator may position brackets at the tools of the cart 56. The work piece may then be moved to the Station 2, which may be adjacent to or relative to the cart 56. The machine apparatus 20 may perform work at the Station 2 in block 192, such as welding brackets to the work piece that may be bumper fascia after the holes are punched therein. It is understood that any appropriate work may be performed and welding the brackets to the work pieces are exemplary.

The machine apparatus 20 may then complete work in block 196. Completing work may include various processes, such as a dwell time to ensure hardening of polymer materials, setting of adhesives, or any other appropriate work completion process. There after the process may then stop in block 200. Stopping in block 200 may include unloading the work piece, initiating processes or work by the operator, or any other appropriate steps. Nevertheless the machine apparatus 20 may be operated to stop or complete the work on the work piece in block 200.

The machine apparatus 20 may be initially configured for work on the fascia. As discussed above, the operator may provide inputs to configure the C-frames 44. Additionally and/or alternately, the cart 56, 56' may include information that is input to configure the C-frames 44. Regardless, the C-frames 44 may be automatically configured by operation of the movement structures 90 based on the appropriate input. Thus, the operator need not manually move and/or replace any of the C-frames 44 for different configurations.

As discussed above, the machine apparatus 20 may be reconfigured to position various portions thereof, such as the C-frames 44 for operation of a plurality of operations on different or alternative work pieces, where the work pieces may differ in size, geometry, etc. Thus, the operator may operate the machine apparatus 20 to ensure that the selected portions, such as the C-frames 44, are positioned in an appropriate position for operation on a selected one work piece.

With reference to FIG. 9, a process 210 illustrates configuring and/or insuring that the machine apparatus 20 is in an appropriate configuration for various machine processes. The process may begin in start block 220 and a tool cart may be, optionally, loaded in block 224. As discussed above the tool cart 56 may include one or more tool carts and may include various tools associated with the cart 56. Accordingly, an operator may position the tool cart relative to appropriate portions of the frame assembly 24 to ensure that the tool portions are positioned at an appropriate position for operation of the machine apparatus 20.

Upon loading the cart, the machine assembly may include a cart reader that may read the cart in block 230. The cart reader may include an RFID reader, specific instructions transmitted via a cart connection 57, 59 to appropriate portions of the machine apparatus 20, or other appropriate communication. In various embodiments, the communication may be wireless and/or via a wired connection. Additionally and/or alternatively, various inputs may be made in block 230 by the operator regarding the C-frame 44 configuration. For example, the operator may include a model or ID number in the input 28 and/or provide specific configuration (e.g., distance, rotational orientation) of the different C-frames 44. Nevertheless, the machine apparatus 20 may read or reconfigure one or more of the C-frames 44 and/or operation of tools held by the C-frames 44 regarding the respective or specific cart positioned relative to the frame assembly 24 and/or the fascia or work piece positioned on the table 40, such as based on appropriate input, including from the operator.

The input may be evaluated based on executing instructions with a processor, such as including the controls 28 to determine an appropriate configuration of the C-frames 44. The processor (also referred to as a processor module or similar) that is designed and/or configurable to execute instructions. The input may include a selected call to a predetermined configuration (e.g., from a database), a set of coordinates, or other input that is used to determine the configuration of the C-frames 44. The controller may execute instructions to then determine how to operate the movement mechanism 90 to move the C-frames 44 to the determined configuration. The controller may then automatically instruct the C-frames 44 to move.

In block 240 the C-frames 44 may be configured per the input from block 230. The configuring in block 240 may include moving the C-frames 44 from the initial position, for example as illustrated in FIG. 4, to the second or alternative position, for example as illustrated in FIG. 7A. It is understood however, the configuration of the C-frames 44 may be to any appropriate configuration. Further, the configuration may be substantially automatic due to the positioning of the cart 56 relative to the frame assembly 24, such as receiving information or input from the cart 56. The cart assembly 26 may include various connections, such as the electrical 57 and/or pneumatic umbilical 59 connections to for connecting to machine apparatus 20. These connections may include various RFID portions and/or offer transmission of information to the machine apparatus 20 for configuring the C frames 44. Thus, the C frames 44 may be configured based upon the position or the configuration of the cart 56, such as having the tools 60 or the tools 60'.

While the C-frames 44 may be moved substantially automatically, the tools 74 that are held and/or carried by the C-frames 44 may also be moved when the C-frames 44 are configured. Moreover, the tools 74 may also be changed for various operations and/or specific work pieces, e.g., fascia. Thus, an operator may change the tools in an appropriate manner, such as with a selected quick connection system. This allows the tools 74 to be changed and/or moved with the C-frames 44.

Therefore, the machine apparatus 20 may be configured to operate or perform work on more than one work piece by configuring the C-frames 44. Configuring the C-frames 44 includes moving the C-frames 44. The C-frames may be moved automatically. The C-frames 44 may be moved by operation of a movement system, such as the movement system 90. The C-frames 44 need not be removed and replaced to the frame assembly 24, including the floor 50, but rather may only be moved relative thereto due to movement systems 90. Thus, configuring the C-frames 44 in block 240 may include moving the C-frames 44 with an appropriate movement apparatus 90, as discussed above.

After configuring the C-frames 44 in block 240, the process 210 may end in block 250. Ending the process in block 250 may include ensuring that the machine apparatus 20 is configured for further work to be performed. The machine apparatus 20, therefore, need not be operated after configuring the C-frames 44 in a selected configuration, but may be ended for various periods of time, such as for a further work shift.

Nevertheless, work may be performed with configured C-frames 44 in block 256. Performing the work with the configured C-frames 44 may include the work performed discussed above. Further, the work performed with the configured C-frames 44 may be any appropriate work as is understood by one skilled in the art. Regardless, the process 210 may then end in the block 250, which may include various ending processes. For example, the operator may remove a work piece, after work is performed, from the machine apparatus 20, may move the work piece to a second or alternative operation position, or other processes may occur with the machine apparatus 20.

Accordingly, the machine apparatus 20 may be used to perform various operations on a work piece by moving the various portions thereof. For example, as discussed above, the C-frames 44 may include sonic punches that punch holes in bumper fascia for installing various assemblies therein, such as brackets and/or electronics. The brackets may allow for mounting of electronics, such as sonic systems to allow for warning or self-driving of a vehicle installed with the fascia and the respectable electronic systems. The machine apparatus 20, therefore, allows the reconfiguration of the C-frames 44 without requiring a specific and separate machine apparatus 20 to be designed and built for the various operations on more than one work piece. All of the C-frames 44 may be provided with a single one apparatus 20, as discussed above, but may be moved/configured within the single apparatus for various work pieces. The single apparatus, therefore, may include several C-frames 44 as discussed above. The exemplary apparatus 20, as illustrated, includes four C-frames 44, but any appropriate number, such as more or less than four C-frames 44, may be provided.

As discussed above the C-frames 44 are provided in the machine apparatus 20 to perform various work operations on work pieces. The C-frames 44 may be moved with of the movement mechanisms 90 discussed above. The movement mechanisms 90 may include various portions, including those discussed above. The movement mechanisms 90 may move the C-frames 44 in any appropriate position, including at least within a three-dimensional space that may be defined by the three axes 94, 98, 120. According to various embodiments, however, as discussed further herein, the C-frames 44 may be moved in an appropriate manner in addition to the movement mechanism and/or alternatively thereto with one or more motors, as discussed herein. The motors may be incorporated into structures or portions relative to the C-frame 44 and may form an alternative and/or additional C-frame component. Further, the movement mechanism may move a C-frame according to various embodiments.

Figure 10:
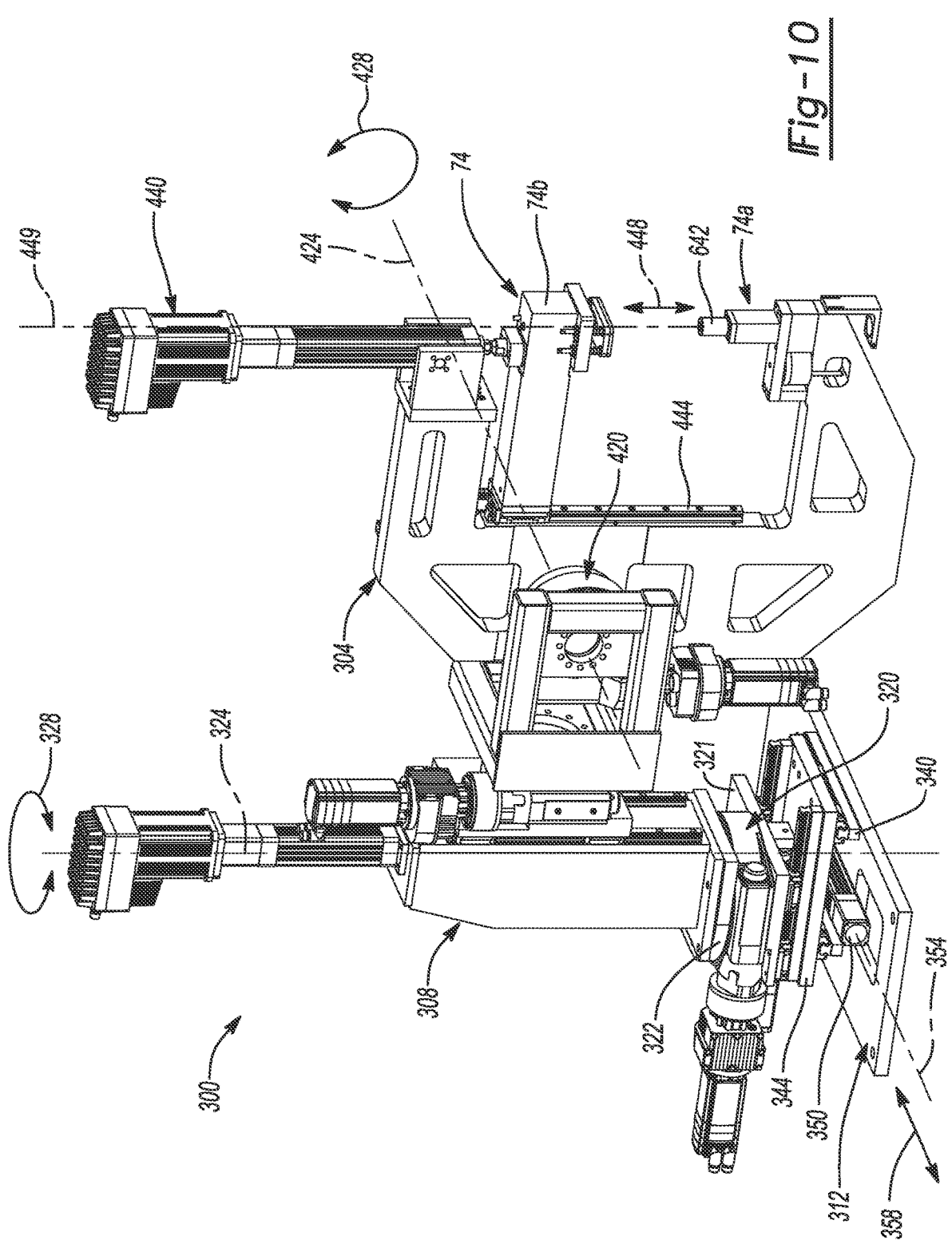
FIG. 10 is a first perspective view of a C-frame apparatus, according to various embodiments.
Figure 11:
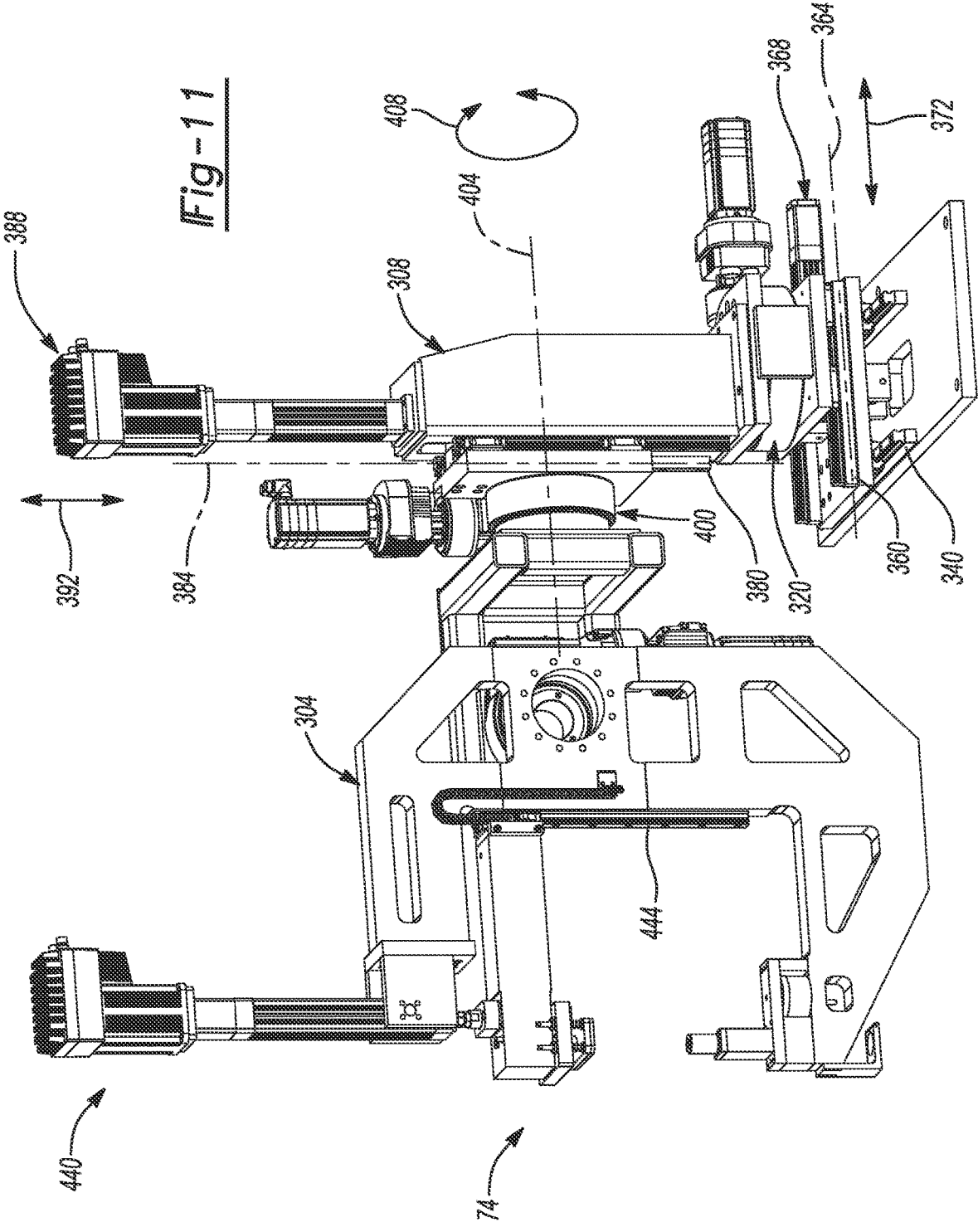
FIG. 11 is a second perspective view of the C-frame apparatus of FIG. 10.
Figure 12:
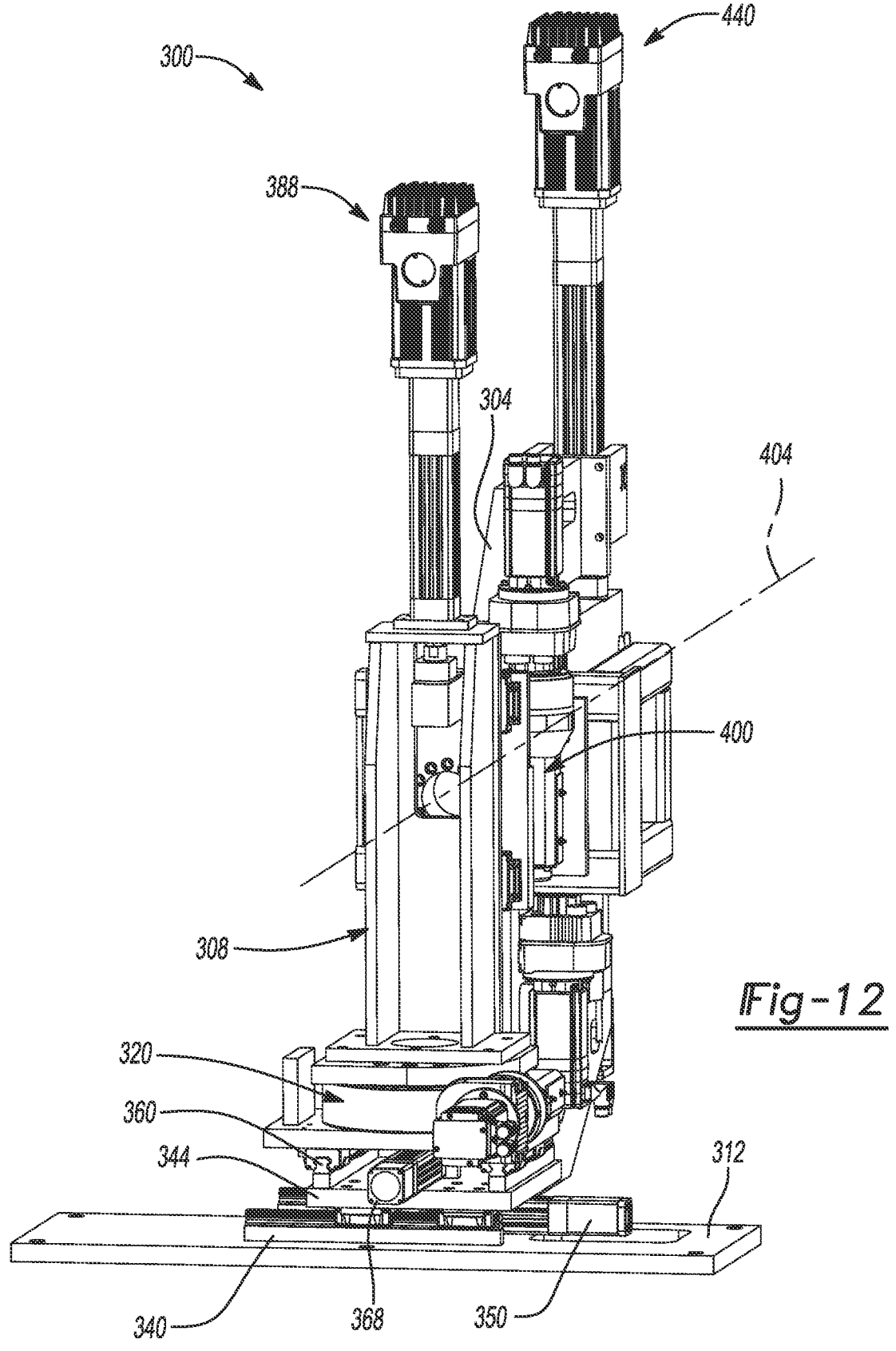
FIG. 12 is a third perspective view of the C-frame apparatus of FIG. 10.
Figure 13:
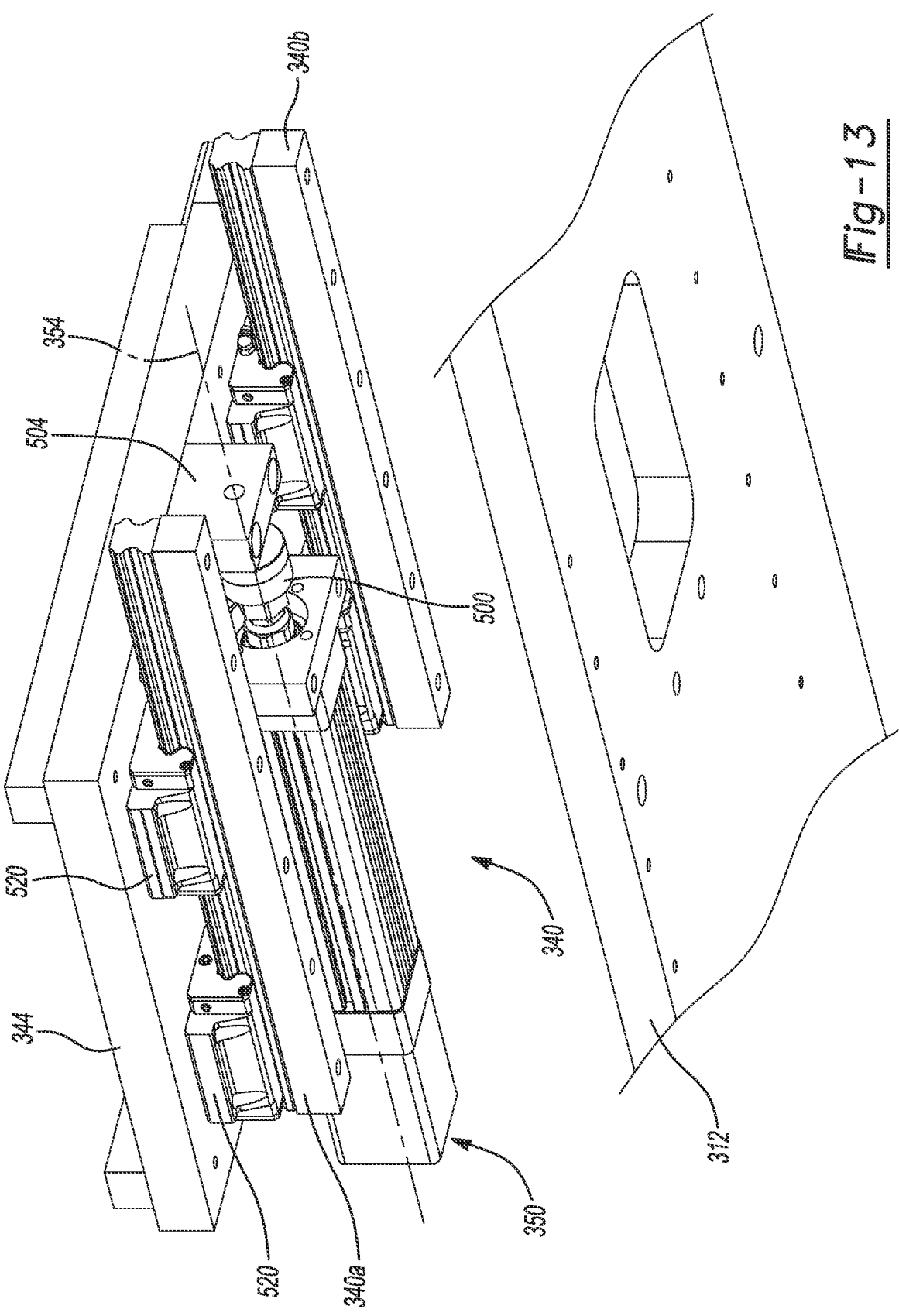
FIG. 13 is a first detailed perspective view of a linear movement system for the C-frame apparatus, according to various embodiments.
Figure 14:
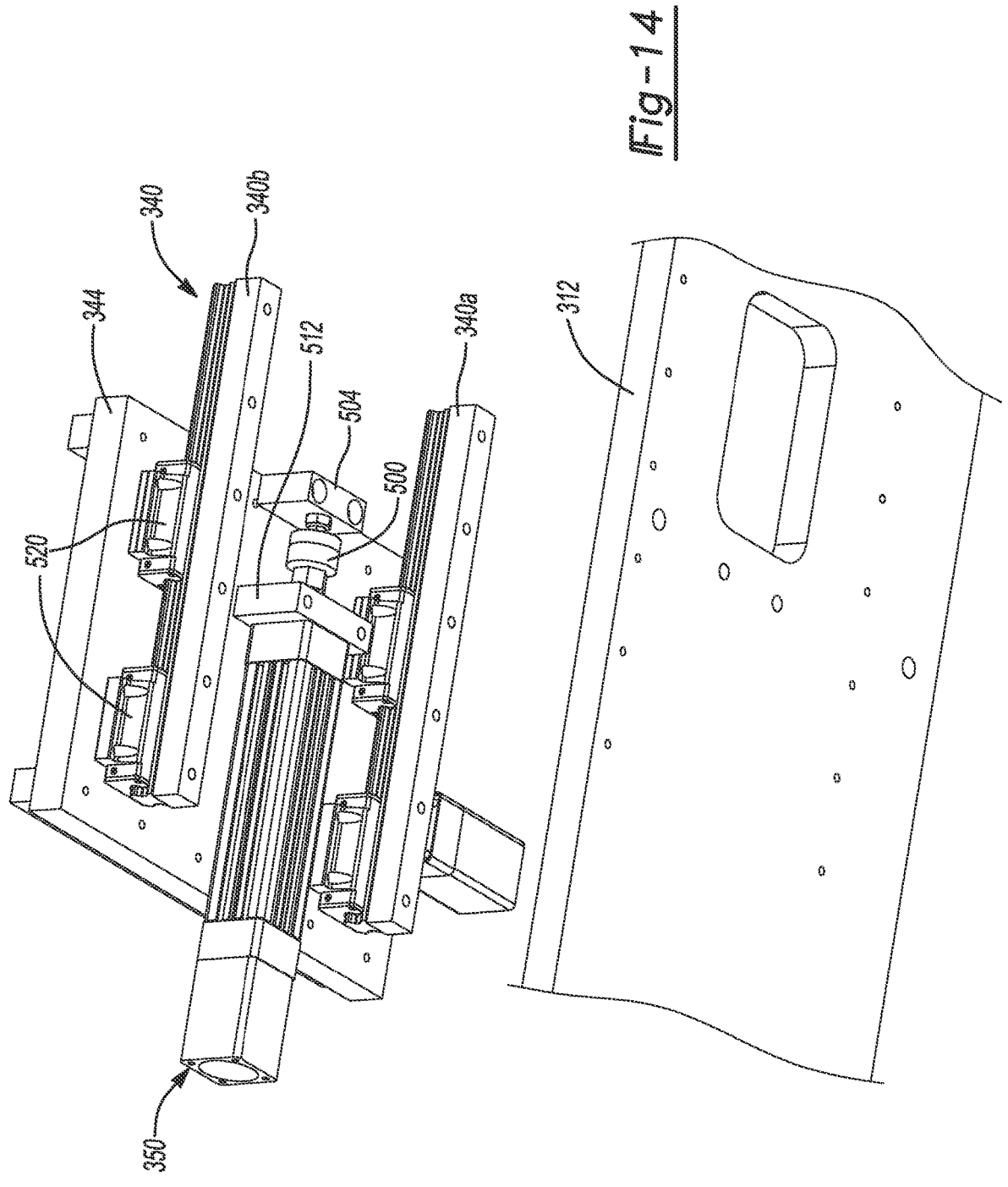
FIG. 14 is a second detailed perspective view of the linear movement apparatus to FIG. 13.
Figure 15:
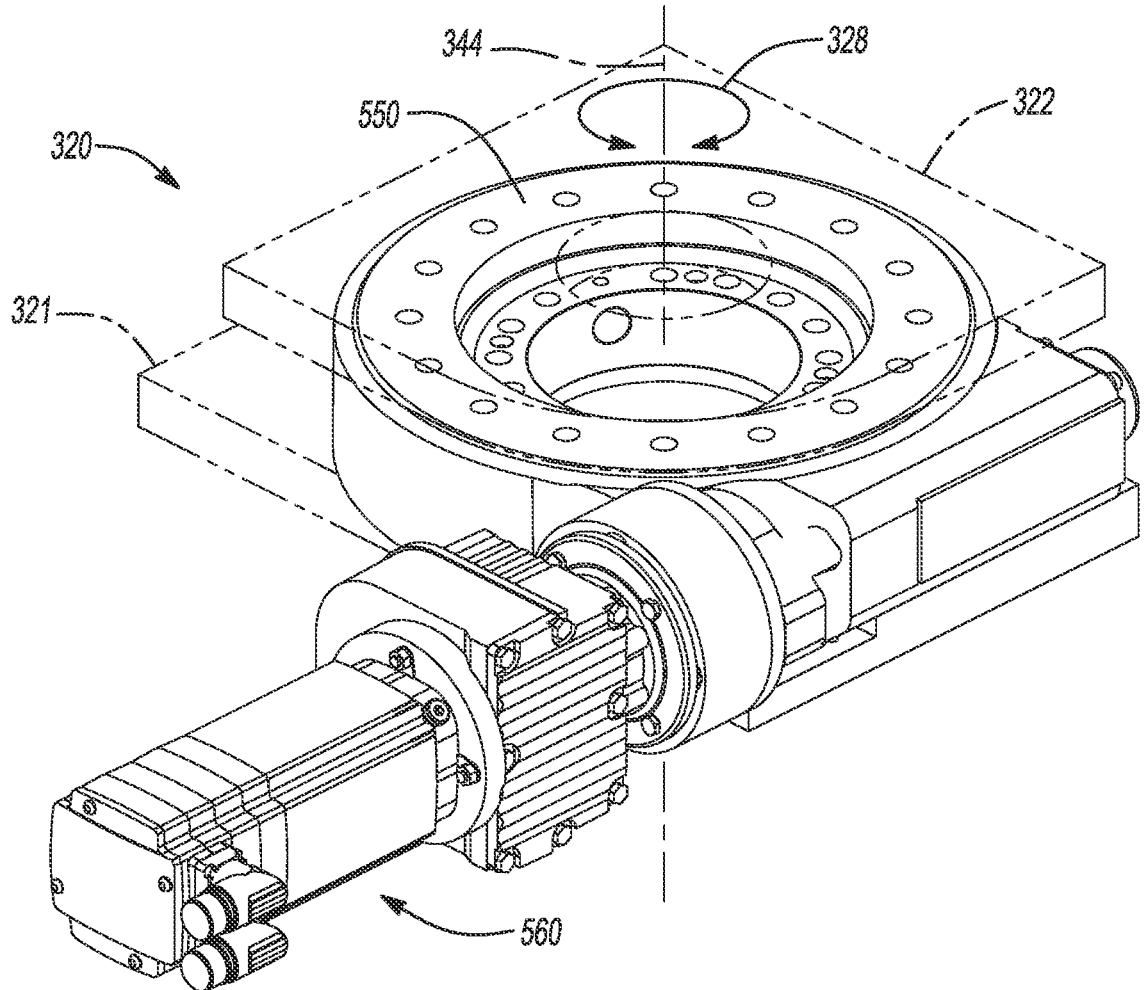
FIG. 15 is a first perspective view of a rotation of movement apparatus for the C-frame apparatus of FIG. 10, according to various embodiments.
Figure 16:
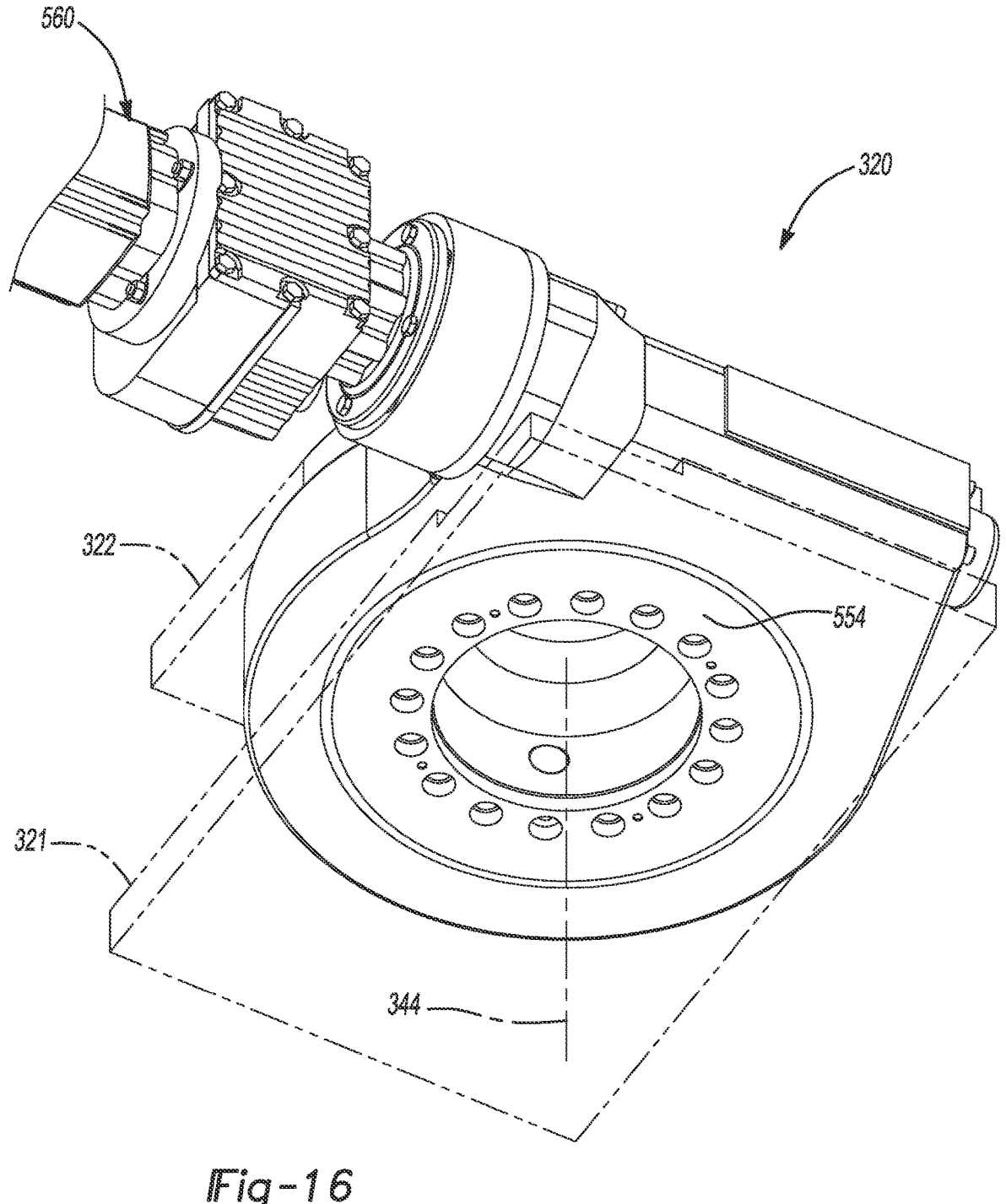
FIG. 16 is a second perspective view of the rotation of movement apparatus of FIG. 15.

With initial reference to FIG. 10, a C-frame 300 is illustrated. The C-frame 300 may include portions that are substantially similar to the C-frame 44 discussed above, save for those noted herein. Disclosure of identical portions will not be repeated here. The C-frame 300, for example, may include a C-frame or tool frame member 304. The C-frame member 304 may be movably connected to a movement or positioning tower 308. The positioning tower 308 may be movably connected to a base 312, which may be any appropriate base or base member. As discussed herein, the C-frame member 304 may, therefore, be moved relative to the base 312 and/or the workpiece 70 in at least a selected number of degrees of freedom, including at least three cartesian coordinate positions and/or three angular positions. This allows the punch assembly 74 to be moved to at least the position within 6 degrees of freedom. The punch assembly 74 may include a fixed or set punch portion 74a and a movable punch portion 74b. The movable punch portion 74b may also be moved by motor, as discussed further herein.

The C-frame assembly 300, as illustrated in FIGS. 10-16 may include the base 312 that may be fixed within the machine apparatus 20 as illustrated above. The base 312 may include a single base for each of the C-frames 44, 300 and/or a single base 312 to which all of the C-frames 300 are connected. The base 313 may be selectively connected to the C-frame member 304. In various embodiments, however, the positioning tower 308 may provide a connection between the C-frame member 304 and the base 312. Various motors, as discussed herein, may power or selectively cause movement of the positioning tower 308 and/or the C-frame member 304 to position the punch assembly 74 at a selected position and/or orientation relative to the workpiece 70.

Each of the motors, as discussed herein, may be controlled by a selected controller which may include one or more processor modules. Appropriate controllers may include controllers that are designed and/or sold with selected motors by one or more of Allen Bradley, JVL, SEW, Siemens, Mitsubishi.

The C-frame member 304 may move relative to the base 312 and/or the workpiece 70 due to one or a plurality of motors and connections be provided between the C-frame member 304 and the base 312. For example, the movement tower 308 may be connected to a rotational movement system 320. The rotational movement system 320 may be any appropriate movement system and included various bearings, gears, and drive portions as is understood by one skilled in the art. The rotational movement system 320 may include a slew drive, such as a WD series slew drive sold by IMO having a place of business in Gremsdorf, Germany.

The rotational movement system 320 may allow rotation of the movement tower 308 around an axis 324 generally in the direction of double-headed arrow 328. The amount of rotation may be any appropriate amount, such as about 0° to about 180°, including about is 0° to about 40° relative to a selected the plane. The selected plan may be a zero or origin plane in the apparatus 20. The rotational movement system 320 may, therefore, allow movement of the C-frame member 304 around the axis 324 to position the tool 74. The movement may be controlled and a selected amount, speed, etc. For example, movement may be about 0.1 to about 10 degrees per 0.1 seconds to about 10 seconds. The rotational movement system 320 may be mounted directly to the base 308 or other mounting plates. For example, the rotational movement system 320 may be mounted to plates 321 and 322

Associate with and/or to allow movement of the movement tower 308 may be further a movement system to allow for axial or linear movements. For example, a first rail or set of rails 340 may interconnect an intermediate base 344 with the base 312. Movement of the intermediate base 344 may be driven by a motor 350 generally in the direction of and axis 354. The motor 350 may include one or more servo motors and/or actuators, the motors may include selected types such as stepper motors. The motors may include those made or sold by at least one of Allen Bradley, JVL, Siemens, SEW, or Mitsubishi.

The motor 350, therefore, may generally move the intermediate base 344 generally in the direction of the double-headed arrow 358. The drive motor 350 may generally move the intermediate based 344 a distance of about 0 millimeters (mm) to about 300 mm, including about 0 mm to about 150 mm. In various embodiments, for example, the motor 350 may move the intermediate based 344 about 30 mm either direction of an origin plane.

On an opposite side of the intermediate base 344 may be a second set of rails 360. Along the second set of rails 360, the movement tower 308 may be moved linearly along an axis 364 with a drive motor 368. The drive motor 368 and may generally move the movement tower 308 in the direction of a double-headed arrow 372. The amount of movement of the drive motor 308 generally along the axis 364 may be similar or equivalent to the distance noted above for the axis 354. Thus, the movement tower 308 may generally move along the axis 364 a selected or appropriate amount. Further, the motor 368 may be similar or identical to the motor 350 noted above.

Thus, the drive motors 350 and 368 may move for the movement tower 308 generally in a plane defined by the axis 354 and the axis 364 generally in the directions of the double-headed arrows 358 and 372. The C-frame member 304 may also move substantially orthogonal to this plane due to one or more rails 380. The C-frame member 304 may be moved along an axis 384 by a drive motor assembly 388 generally the direction of the double-headed arrow 392. Thus, the C-frame member 304 may also move orthogonal to the plane defined by the axes 354 and 364. The amount of movement along the axis 384 generally in the direction of the double-headed arrow 392 may be similar to or identical to the amount of movement as discussed above. Further, the motor 388 may also be similar to identical to that noted above.

The C-frame member 304 may also rotate relative to the movement tower 308. As noted above, the rotational movement assembly 320 is positioned between the movement tower 308 and the intermediate base 344. Similarly, a rotational assembly 400 may be positioned between the C-frame member 304 and the movement tower 308. The rotational assembly 400 may rotate the C-Frame member 304 around an axis 404. Generally, the rotation may be in the direction of a double headed arrow 408. The amount of rotation about the axis 404 may generally be similar to the same amount of rotation noted above regarding the rotation assembly 320. Similarly, the rotational assembly 400 may be similar or identical to the rotational assembly 320 including a motor to drive the movement. Also, the rotation assembly 400 may be incorporated into the C-frame assembly 300 in any appropriate manner.

A rotational assembly 420 may rotate the C-frame 304 around an axis 424 generally in the direction of the double headed arrow 428. The amount of rotation of the C-frame member 304 relative to the axis 424 may also be similar to that noted above. Similarly, the rotational assembly 420 may be similar or identical to the rotational assembly 320 including a motor to drive the movement. Also, the rotation assembly 420 may be incorporated into the C-frame assembly 300 in any appropriate manner.

Thus, the punch assembly 74 may be rotated relative to the apparatus 20 and/or moved linearly in at least three degrees of freedom for both rotation and linear movement. The punch assembly 74, therefore, may be moved relative to the workpiece 70 to form a selected punch hole therein, as discussed above. Moreover, the movable portion of the punch assembly 74b may also be move substantially linearly relative to the C-frame member 304. A drive motor 440 may move the movable punch assembly portion 74b along a rail or track 444 generally in the direction of a double headed arrow 448 along an axis 449. The rail or guide 444 may, however, guide the movable punch assembly portion 74b in any appropriate manner. The movement of the movable punch assembly 74b may be an appropriate amount to move the movable punch assembly portion 74b relative to the workpiece 70 allow for work to be performed on the workpiece 70. The amount of movement, such as alone the axis 449 may be about 0 mm to about 500 mm, including about 0 mm to a maximum amount of movement of about 150 mm to about 250 mm.

As noted above, various linear and rotational assemblies may be incorporated into the C-frame 300 to selectively move and position to the tool 74. The rails for the linear rail portions may be appropriate rails or guides may include linear guides, such as a linear guide sold by THK having a place of business at Minato-ku, Tokyo, Japan. The motors to linearly drive the selected portions may include appropriate motors, such as those noted above that may be obtained from Allen Bradley, JVL, SEW, Siemens, or Mitsubishi. The rotational drive assemblies may include the slew drives, as noted above. The slew drives may be driven by appropriate motors, such as those from IMO and/or the motors from one or more of Allen Bradley, JVL, SEW, Siemens, or Mitsubishi. Further, each of the assemblies, including the motors therefore, may be controlled with selected control systems, such as controllers that are designed and/or sold with selected motors by one or more of Allen Bradley, JVL, SEW, Siemens, Mitsubishi.

The machine apparatus 20, 600, according to various embodiments, may further include a programmable logic controller (PLC) of appropriate design to control operation of the apparatus that may be and/or included with the displays and controls 28. The PLC may be provided and/or programmed to operate and control the various motors and/or robots to achieve operation of the machine apparatus 20, 600 as discussed above. For example, the operation as illustrated in discussed in the flowcharts 160, 210, 700, 770, or 840, according to various embodiments, may be incorporated into instructions that may be executed in whole or at least in part by the PLC. The displays and controls 28 may include one or more human interface portions that may be provided to initiate operation, make selections, and the like. The human interface portions may include one or more buttons, turn knobs, touch screen, keyboard or keypad, etc.

The various movement or drive systems, as discussed above, may include various options for systems including those noted above. With exemplary discussion of FIGS. 13 and 14, the motor 350 is illustrated relative to the rail assembly 340. The rail assembly 340 may be connected to the base 312, as discussed above. The motor 350 may drive a piston 500. The piston 500 may move a block 504 that is fixed to the intermediate plate 344. The motor 350 may be fixed to the base 312 via a second block 512. Thus, driving of the piston 500 by the motor assembly 350 may move the intermediate base 344 relative to the base 312. The rail assembly 340 may include a plurality of rails such as a first rail 340a and a second rail 340b. The two rails 340a, 340b may allow forces to be balanced between the base 312 and the intermediate base 344. One or more guide members or guides 520 may be fixed to the intermediate base 344 and slide along the rails 340. Thus, the intermediate base 344 may be moved relative to the base 312 by the motor assembly 350 moving the intermediate base 344 such that to the guides 520 ride along the rails 340.

One skilled in the art would understand that the motor assembly 350 may be operated in a selected manner and include any appropriate motor or drive system, such as an electric motor, and hydraulic drive, or other appropriate drive mechanism to move the piston 500. Further one skilled in the art understand that appropriate bearings or bearing materials may be provided between the guides 520 and the rails 340, the piston 500 and the housing of the motor assembly 350, and other appropriate portions. Nevertheless, the intermediate base 344 may move relative to the base 312 generally along the axis 354. Similarly, the other rail movement assemblies and a drive systems, such as the drive system with the motor 368, 388, and 440 may also move in a similar manner and include a similar or identical portions is exemplary discussed above.

Similarly, as discussed above, the rotational drive assemblies may be interconnected between various portions of the C-frame assembly 300 to allow for rotational movement of various portions of the C-frame assembly 300. The rotational drive assemblies may include various components, as exemplarily illustrated in FIGS. 15 and 16 regarding the rotational drive 320. The rotational drive assembly 320 may include a first bearing or mounting portion 550 and a second or opposed bearing or mounting portion 554. The two bearing portions 550, 554 may be interconnected to two portions to be rotated relative to one another. The first bearing or mounting portion 550 may rotate generally in the direction of the double-headed arrow 328 relative to the axis 334. The mounting plate 550 may move relative to a housing or the second mounting plate portion 554. Thus, the portions of the C-frame assembly 300 may rotate relative to one another when both are mounted to the rotational movement assembly 320.

The rotational movement assembly 320 may include various portions such as a drive motor 560 to drive the rotational portion 550 relative to the non-rotation portion 554. The drive motor may be any appropriate type of drive system such as an electric motor, hydraulic motor, or the like. The drive system may include rotating a worm gear or other appropriate drive member to cause the rotation movement about the axis 344. Again, as is understood by one skilled in the art, various control systems may be used to control movement of the motor 560 and/or other portions of the rotational system 322 to cause rotation.

Further it is understood that the various rotational movement systems, including the rotation movement system 400 and the rotation of movement system 420 may include similar or identical portions to that discussed above as exemplary illustrated in FIGS. 15 and 16 and will not be repeated. One skilled in the art will understand, however, that various portions may be altered and/or added to assist in connections, movement, limitations of movement, or the like.

The apparatus 20, as discussed above, can include any appropriate number of C-frames according to various embodiments, including the C-frames 44, 300. In addition, the apparatus 20 may include various components such as the welding or cartridge carts 56. As illustrated above, the tool apparatus 20 may include a selected number of the C-frames 44 including the four C-frames 44. Additionally and/or alternatively the C-frames may be the C-frames 300 as discussed above. An appropriate number of the welding or cartridge carts 56 may also be provided to be associated with the machine apparatus 20. Further, the C-frames may be moved in any appropriate manner such as with the movement mechanisms 90 discussed above and/or with the plurality or selected number of motors and movement portions as noted in the C-frames 300.

Figure 17:
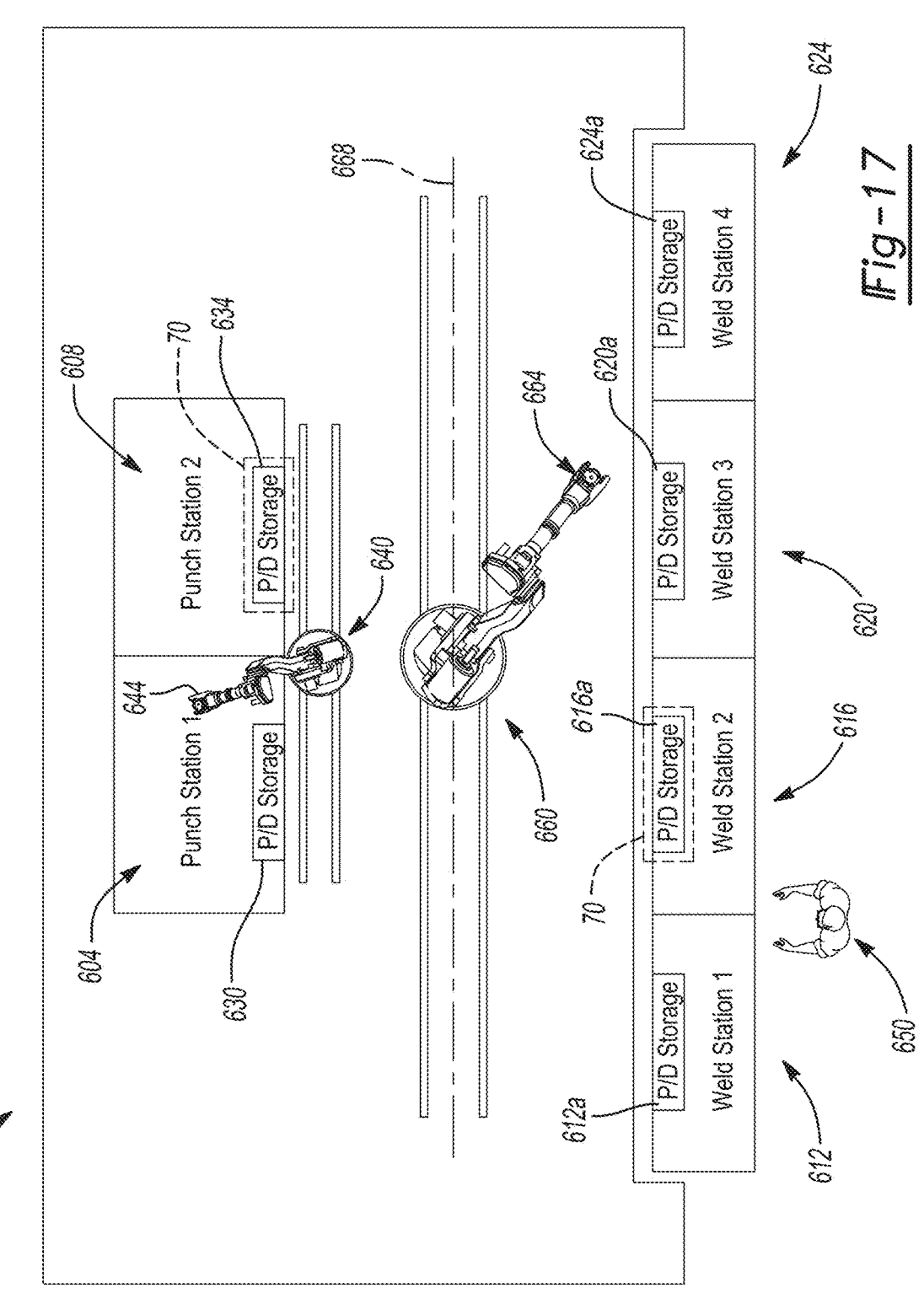
FIG. 17 is a schematic view of a tool apparatus, according to various embodiments.

As illustrated in FIG. 17, according to various embodiments, a plurality of stations and/or portions may be provided in a tool apparatus 600. The tool apparatus 600 may be similar to the tool apparatus 20 discussed above save for those portions discussed herein. For example, the tool apparatus 600 may include a plurality of the punch stations including a selected number of the C-frames, including a first punch station 604 and a second station 608. Each of the punch stations may have an appropriate number of the C-frames, including four of the C-frames. As exemplary discussed herein, the punch stations 604 and 608 may include four of the C-frames 300. It is understood, however, that the punch stations 604 and 608 may include any appropriate number of the C-frames 300, 44.

Each of the punch stations 604, 608 may be substantially identical to one another. In various embodiments, each of the punch stations may include four of the C-frames 300. The tool apparatus 600 may further include a selected number of the weld carts or stations, such as a first weld station 612, a second weld station 616, a third weld station 620, and a fourth weld station 624. Each of the weld stations 612-624 may be substantially similar to the weld cartridge or cart 56 as discussed above. Each of the weld stations or carts 612-624 may be removably positioned relative to the tool apparatus 600. A plurality of the carts may be provided for the tool apparatus 600 including more than four such that the weld stations may be interchangeable and/or provided for a selected workpiece. Further, as discussed further herein, be a plurality of the weld stations may allow for an efficient workflow of a plurality of work pieces differing from one another, including different weld and/or punch portions or positions.

As discussed above each of the weld carts may have different tools and/or tool parts that allow for different welding positions on the workpiece 70. One or more users may move the carts 56 relative to the weld stations 612-624 to provide weld points and/or other tool portions relative to the machine and tool apparatus 600.

As noted above the punch stations 604, 608 may include a plurality of the C-frames 300. For or at each of the C-frames 300 may be various tools that are provided for the punch tools 74. For example different sizes, shapes, or the like may be included in the punch tool portion 74. Therefore a tool storage may be provided for each punch station. For example, a first tool storage 630 may be provided for the first punch station and a second tool storage 634 may be provided for the second punch station 608. A tool change system, such as a tool change robot 640 may be provided relative to the punch station 604, 608. The total change robot 640 may be any appropriate robot that may move relative to the punch stations 604, 608. The robot 640 may be an appropriate robot, such as a robot provided by Fanuc having a place of business in Rochester, MI or ABB having a place of business in Auburn Hills, MI Exemplary robots may be the IRB 6660 sold by ABB, which may be adapted as required to move selected pieces or a M-900 series robots sold by Fanuc.

The robot 640 may include an arm 644 that moves relative to the storage areas 630, 634 and the various C-frames 300 of the respective punch stations 604, 608. Thus, the tools may be interchanged within the selected C-frames 300 according to various specifications and configurations. As noted above, the workpiece 70 may have a specific design and/or work that may be associated with of the respective cartridge carts 56 and/or due to other instructions that may be input by the user, such as a user 650. Thus, the tool robots of 640 may pick the appropriate tool and insert it in the appropriate C-frame 300.

The tool may be placed in the appropriate C-frame 300, such as on the fixed or set punch portion 74*a*. The tool robot 640 may selectively engage the tool and place it and/or engage it with a tool holder 642 of the fixed punch portion 74*a*. The tool holder 642 may include a magnetic tool holding portion to engage the tool to selectively and appropriately hold the tool during operation of the punch 74. The magnetic tool holding portion may include permanent magnets, electromagnets, or any appropriate magnets. The magnetic tool holding system which may include those sold by Kendrion, LLC having a place of business at Mishawaka, IN.

Additionally, the tool apparatus 600 may include a part or workpiece robot 660. The part robot 660 may include an appropriate robot such as those noted above. The part robot 660 may move relative to each of the weld station 612-624 and each of the punch stations 604, 608. The part robot 660 may include an arm mechanism 664 able to engage and move the workpiece 70 from one or more of the weld stations, such as the weld station 616 to one or more of the punch stations 604, 608 such as the punch station 608. The robot 660 may move rotationally, such as between the respective weld station 612-624 and the punch station 604, 608 and/or axially generally along the axis 668 within the tool apparatus 600. Thus, the robot 660 may move the workpiece 70 between the selected punch stations 604, 608 and the weld station 612-624. The user 650 may load and unload the workpiece from the selected weld station based upon appropriate instructions and/or processes as discussed above and further herein.

Thus, the tool apparatus 600 may allow for a plurality of the punch stations, such as 2 of the punch station 604, 608 and a plurality of the weld stations, such as for wild stations 612-624. It is understood by one skilled in the art to that to the number of punch stations and/or weld stations may be altered, such as increased or decreased, depending upon a selected process and/or workflow. The tool apparatus 600 may include any appropriate number of either or both of the punch stations and the weld stations. As noted above the punch stations may include appropriate number of the C-frames 300 and/or the C-frames 44, according to various embodiments. Thus, the tool apparatus 600 may allow for work to be performed on a selected workpiece, such as the workpiece 70, at any of the selected punch stations or weld stations.

As discussed above, the tool apparatus 20, 600 may be operated according to various embodiments. For example, a technician or user 650 may provide input to cause operation of various automated portions of the tool apparatus 20, 600. According to various embodiments, for example, the tool apparatus 600 may be operated with input from the user 600 based upon instructions stored in a processor module, as discussed above, (also referred to as a processor module or similar that is designed and/or configurable to execute instructions). The processor module may execute instructions in line with or of a process 700 illustrated in FIG. 18 including the tool removal process 700. The tool removal process 700 may include removing a tool from one or more of the C-frames 300, according to various embodiments, in the tool apparatus 600. It is understood that the tools may also be removed from C-frames according to any embodiments, including those discussed above.

The tool removal process 700 may begin at start block 704. A receiving of a tool removal control system selection in block 708 may be made. For example, the tool removal selection may include the operator providing inputs to the tool apparatus 600, the operator installing a selected one of the cassettes 56, or other appropriate inputs. Regardless of the control system may receive the tool removal instruction or selection in block 708. Receiving input regarding operation may then occur in block 712, such as identifying a specific one of the C-frames 300 from which the tool is to be removed, which tool is to be removed, where the tool is to be stored, or the like. The received operation in block 712 may also include a type or model of workpiece 70 to be worked on, the work to be performed, or other operation steps that the tool apparatus 600 will perform.

After receiving the input regarding the operation block 712, a recall of which tools are to be removed from the first punch station may be made in block 716. After recalling which tools are to be removed from the first punch station in block 716 the process 700 may move to a subroutine of operate tool robot in block 720. It is understood that the tool robot 640 may perform various actions, such as those discussed herein. In various systems, however, a separate robot, the partner about, or other operator may perform various functions. Nevertheless, of the subroutine 720 includes removing the tool for the punch station block 724. The remove tool may be placed on the cassette 56 in block

728. As discussed above, the cassettes 56 may be move relative to the tool apparatus 600 to assist in providing automatic programming for configuration, positioning of the weld portions and/or tools for various operations, and the like. Accordingly, tools may be placed on the cassettes in block 728. Further, the robot 640 may place the tool in the storage 630, 634 and a second robot or the operator 650 may place the tool storage on a selected one of the cassettes. Thus, the tool removal may include placing the tool with an appropriate cassette 56.

Confirmation may be made that the tool is remove from the C-farm 300, such as it is replaced in the cassette 56 in block 732. The confirmation may include a sensor in the cassette 56 confirming positioning of the tool therein. Further confirmation may be provided by the user as a selected input, as noted above. The cassette 56 may be removed from the tool apparatus 600 and a confirming cassette is undocked in block 736 may occur. As noted above, various connections, sensors, and the like may be used to determine the position of the cassette 56 relative to the tool apparatus 600.

The system may then determine whether more than a single tool removal is to occur in determination block 740. If a determination is made that that additional tools from additional stations and/or C-frames is to occur a YES path 744 may be followed to recall which tools are to be removed in block 748. Thereafter, operation of the tool moving robot in the sub-process 720 may be followed as discussed above. If no additional tools are to be removed a NO path 752 may be followed and the process may end in block 758. Thus, a tool may be removed from one or more of the C-frame 300 and positioned on the cassette, as discussed above, to remove tools to assist in configuring the tool apparatus 600 for a selected operation.

Figure 19:
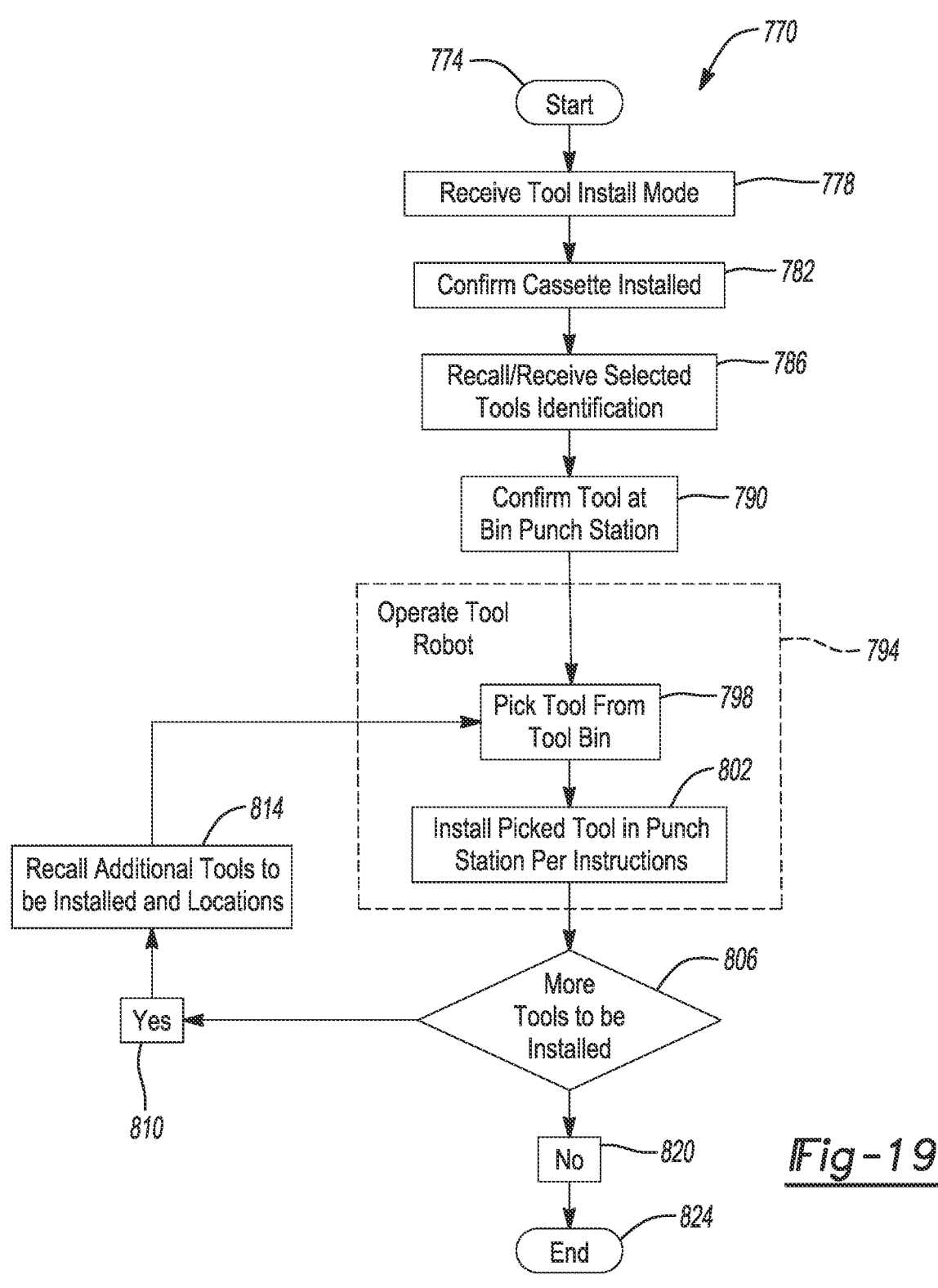
FIG. 19 is a flowchart for a process for installing a tool, according to various embodiments.

As discussed above a tool removal process 700 is illustrated in FIG. 18. A tool insertion or installation process 770 is illustrated FIG. 19. Thus, tools may be removed and/or installed in the tool apparatus 600, 20, according to various embodiments. The process 770 may be executed by control with one or more processors (also referred to as a processor module or similar) that is designed and/or configurable to execute instructions.

The tool removal process may begin in block 774 and receiving a tool install mode instruction in block 778. Receiving the tool install instruction mode may include a user inputting with a selected input device, that the tool apparatus 600 is to be prepared for a tool install. Additionally, as noted above, the cassette 56 may be inserted into the tool apparatus 600 and such a new installation may be determined automatically to be a tool install mode selection. The preparation mode may include various portions returning to a home position, such as the tool robot 640 and/or the C-frame 300.

Optionally, a confirmation that the cassette 56 is installed may be made in block 782. Confirmation that the cassette 56 is installed may be manual by the user, automatic by receiving a signal from the selected sensor or plug, or other appropriate confirmation of cassette 56 install. Regardless confirmation of the cassette being installed block 782 may assist in ensuring that the appropriate portions are aligned and provided for the tool installation. Requiring or confirming cassette installation, however, may be optional in the process 770.

A recall or receiving a selected tools for installation is made in block 786. The recall or the received tool selection may include identification of specific tools, configuration thereof in the C-frames 300, or other appropriate identification. Again, the tools may include a punch or other appropriate tools that may be inserted into the punch portions including the C-frames 300.

A confirmation that the tool bin is at a punch station may be made in block 790. In various embodiments, a tool bin may include tools for installation into the C-frames 300, such as the storage 630, 634. As discussed above, the tool bin may be associated with the cassette 56 and the user may move it to a tool installation region, such as relative to the punch stations, including the tool storage 634. The tool bin at station confirmation block 790 ensures that the tools are positioned for the tool robot 640 to move to a selected position, if selected.

As discussed above, and operation of a tool robot may be a sub-process that may allow for portions to be operated or performed by the tool positioning robot 640. It is understood, however, that manual positioning of various tools may also occur and operation or use of the tool robot is optional in the process 770. Nevertheless, the tool robot 640 to may be operated in the sub-process 794. The sub-process 794 includes picking a tool from the tool bin in block 798. Picking the tool from the tool bin may include engaging (e.g., with a portion of the robot 640) a selected tool for installation into the C-frame 300. The picked tool in block 798 may be installed in the selected station per appropriate instructions or configurations in block 802. The installation of the tool may be made within the tool robot 640. The installation may include positioning the tool in an appropriate position relative to the C-frame 300 including ensuring positioning for operation of the C-frame 300. Tools may be secured to C-frame via the magnetic tool holder system, as noted above. Confirmation of proper placement of the tool to the C-frame 44, 300 may be verified by die closure switch (not illustrated). The die closure switch may be an electronic or mechanical switch that is positioned with the tool holder 642. Confirmation of correct tooling being positioned in the tool holder 642 may be accomplished via a radio frequency identification (RFID) system. The RFID system may include a RFID tag on the tool and a RFID reader on or near the tool holder 642. The RFID reader may read or receive a signal from the RFID tag and send the signal to the controller. The signal may be used to determine the identity of the tool and a process (e.g., comparison to a lookup table) may be used to confirm that the identified tool is the proper tool for the work to be performed on the workpiece 70. If the tool is proper, the punch may be operated. If the tool is not proper, the tool may be changed, the user 650 may be alerted, and/or the apparatus 600 may be stopped for inspection.

The process 770 may then determine whether more tools are to be installed in block 806. If more tools are to be installed a YES path 810 may be followed to recall additional tools to be installed and locations in block 814. After recalling additional tools to be installed the operating the robot subroutine may be entered to pick and install tools in blocks 798 and 802. Thus, the process 770 may include installation of any appropriate number of tools in the punch stations of the tool apparatus 20, 300 as discussed above.

If no more tools are to be installed a NO path 820 may be followed to end the process 770 in block 824. Thus, the process 770 allows for installation of an appropriate too and an appropriate number of tools at appropriate locations for performing of a procedure with the tool apparatus 600.

As discussed above, a workpiece 70 may be positioned relative to the tool apparatus 20, 600 for performing work on the workpiece 70. The work may include punching and/or welding or other appropriate work. Therefore, removal and installation of tools according to the selected processes 700,

770 may be performed due to configured that the tool apparatus 20, 600 for the appropriate work to be performed.

Figure 20:
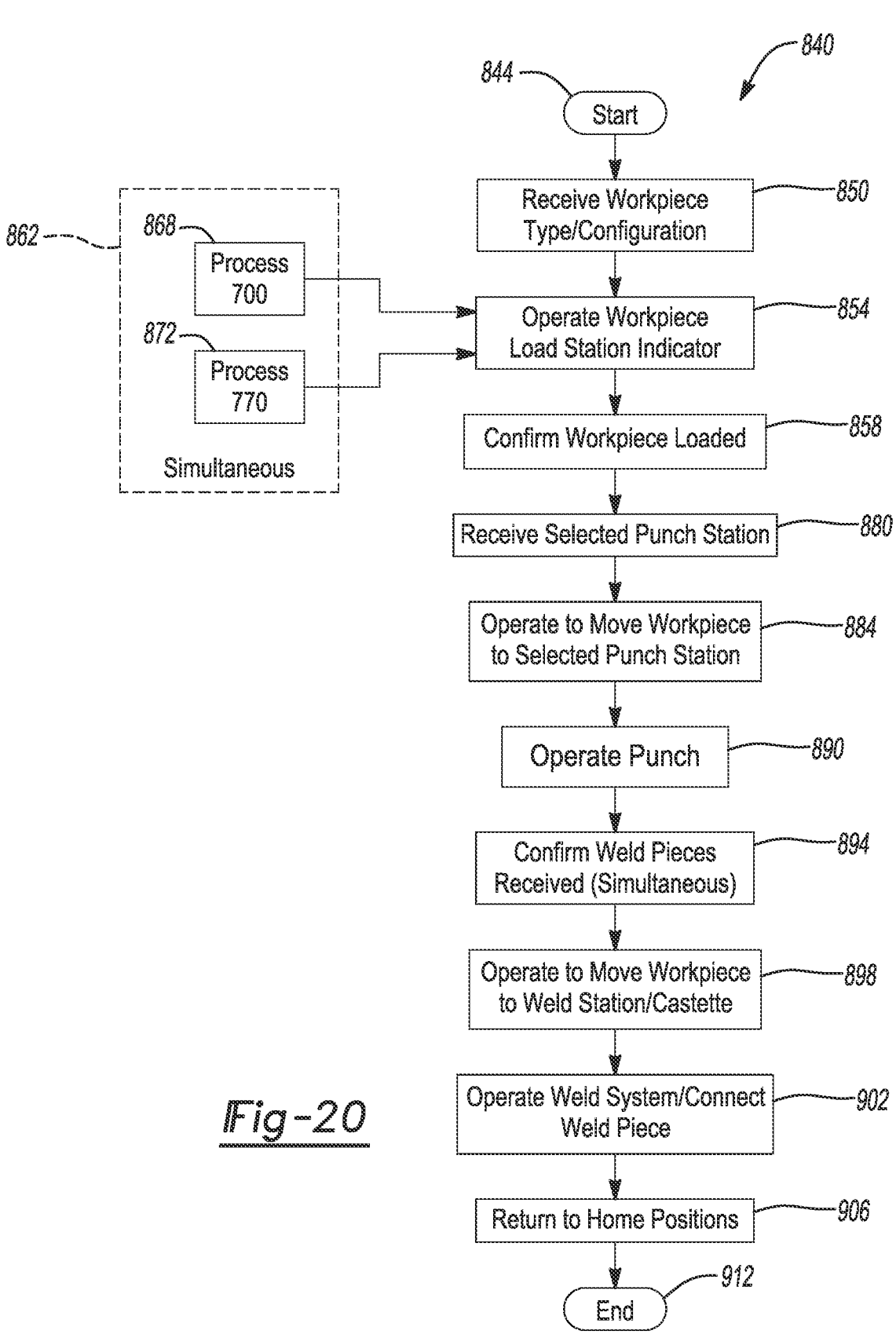
FIG. 20 is a flowchart for a process of operating a tool apparatus, according to various embodiments.

According to various embodiments, the operation of the tool apparatus 600 with the appropriate tools installed may occur according to the process 840 is illustrated in FIG. 20. The process 840 may be executed by control with one or more processors (also referred to as a processor module or similar) that is designed and/or configurable to execute instructions.

As noted above, the tool apparatus 600 may be prepared for a procedure on a workpiece, such as the workpiece 70, that is positioned within the tool apparatus 600. The tool apparatus 600 may include a plurality of punch stations and a plurality of weld stations, as noted above. An action may occur between any one or more of the weld stations and any one or more of the punch stations. Therefore, the tool apparatus 600, according to various embodiments, may operate in a plurality of manners including with some or selected simultaneous actions. This may include punching at least two different configurations on one or more workpieces. The process 840 illustrates a process for operation of the tool apparatus 600, according to various embodiments.

The process 840 starts in block 844. After starting the process in block 844 a receipt or work type or configuration is made a block 850. Receiving the workpiece type or configuration may include receiving a type of workpiece, configuration of the workpiece 70, configuration of various portions of the tool apparatus 600, or other inputs. The inputs may be provided by the user 650 or other appropriate inputs. For example, the tool apparatus 600 may include a reading system, such as a barcode scanner, to scan and read a barcode of the workpiece 70. The control system may include a memory and a processor module, as discussed above, to recall of the configuration required for the particular workpiece based on reading the barcode. Therefore, receiving the workpiece have configuration may include receiving appropriate information and determining a configuration of the tool apparatus 600, including the components thereof, for performing the appropriate work on the workpiece 70.

After receiving the workpiece type or configuration in block 850 the tool apparatus 600 may be selectively or optionally operated to indicate a loading of the station in block 854, such as one or more of the weld stations 612-624. A work piece load indicator may indicate a position for loading the workpiece 70, such as by the operator 650. The indicator may include a visual cue (e.g., a light) haptic feedback, etc. A confirmation that the workpiece has been loaded may be made in block 858.

Confirmation may include a further input by the operator 650, a sensor of the tool apparatus 600 (such as a scale on one or more of the weld stations), or other appropriate confirmation input.

Further, the configuration received in block 850 may include information or instructions about removing and/or installing tools according to the processes and 700 or 770. Accordingly, simultaneously and/or prior to the confirming the workpiece is loaded in block 858 a tool removal and/or installation sub-process 862 may occur. The tool removal and installation sub-process 862 may also be a configuration sub-process and may include the process for removing a tool in block 868 and a process for installing the tool in block 872. Thus, the tool apparatus 600 may be configured including positioning appropriates tools and/or removing appropriate tools for work on the workpiece 70. In configuring the tool apparatus 600, the tool apparatus may be configured to perform a selected operation on the workpiece 70 based upon positioning of the various C-frames 300, 44 and positioning of tools relative thereto. The work performed on the workpiece 70 may be specific and unique to a single workpiece and may differ between workpieces.

The process 840 further includes receiving a selected punch station in block 880. Receiving a selected punch station may include selecting either one of the punch station one 604 or the punch station two 608. It is understood, as noted above, that the tool apparatus 600 may include more than the two punch stations and the two punch stations is merely exemplary. Regardless receipt of which of one or more of the punch stations is selected is made in block 880.

Once the punch station is selected and received in block 880, operation may move the workpiece to the selected punch station in block 884. The part robot 660 may move that the workpiece 70 from one of the selected weld stations 612-624 to the selected punch station 604, 608. Thus, the workpiece may be positioned in any appropriate one of the weld stations and moved to an appropriate one of the punch stations. The robot 660 may be operated to move the workpiece to the punch station according to generally known movement techniques. As discussed above, the robot may include various portions such as a six-degree of freedom of movement end effector, various articulated arm portions, and the like to allow for movement of the workpiece to an appropriate position relative to one or more of the punch stations 604, 608.

After positioning the workpiece 70 in the punch station, the punch may be operated in block 890. As discussed above the operation of the punch in block 890 may include moving any one of the selected punch apparatuses, such as include with the C-frames 300, relative to the workpiece. As also discussed above any one or more of the C-frames 300 may be moved to a selected position to form a punch of the workpiece and/or moved out of the way to not punch the workpiece 70. Thus, the workpiece 70 may be moved relative to one of the selected punch stations 604, 608 and a punch operation may be performed on the workpiece 70. The punch station may be configured by removing and/or installing tools and/or moving selected C-frames 300 to an appropriate position to form the appropriate punch.

The process 840 may also include confirming that parts for welding (such as brackets) and weld tools are received and/or positioned in the appropriate weld station 612-624 in block 894. It is understood that the weld parts and tools may be positioned and confirmed in any appropriate time in the process 840, such as during movement of the workpiece 72 to the punch station, during operation of the punch station, and the like. Nevertheless, the confirmation that the weld parts and tools are received in the weld station may occur to assist in performing the welding process.

The tool apparatus 600 may be operated to move the workpiece to the weld station cassette in block 898. Here, again, the part robot 660 may engage that the workpiece 70 and move the workpiece 72 to one of the selected weld stations or cassettes 612-624. The selected one of the weld stations may be selected during the receiving of the workpiece type and configuration in block 850 such that the robot 660 may substantially automatically move the workpiece to the appropriate and appropriately configured weld station.

The weld station may then be operated to weld the workpiece in block 902. The process 840 may then allow various portions of the system, such as the C-frames and/or the weld station portions to return to home positions for in block 906. The process 840 may then and in block 912.

The operation of process 840 may allow for substantially automatic movement and operation of work on the workpiece 70. The tool apparatus 600 may be configured in block 850 and thereafter the tool robot 660 may move the workpiece to a selected one of the punch stations, the punches may be operated in the punch stations, and the part robot 660 may move the workpiece back to one of the selected weld stations for welding of the workpiece 70. Thus, operation of the tool apparatus 600 may be substantially automatic based upon instructions and configurations received regarding the workpiece 70.

Further, as illustrated in FIG. 17, the tool apparatus 600 may include a plurality of the weld stations 612-624. Each for the weld stations may be individually configured for different configurations of work pieces. Therefore, according to the example illustrated in FIG. 17, the tool apparatus 600 may be operated to substantially work on four different configurations of work pieces substantially simultaneously or at least sequentially without installing or replacing new weld station cassettes 56. Further, each of the cassettes 56 may include tool storage for installation into the C-frame 300 punches. The tools may be stored in respective tool storage bins 612a, 616a, 620a, and 624a. The tools stored with the cassette 56 may be unique to the cassette and allow for efficient setup of the tool apparatus 600.

The workpiece 70 may be moved to and from the selected weld stations and to and from the selected the punch stations to achieve operation on a plurality of configurations in sequence without requiring replacement of the C-frames 300 in the punch station 604, 608 and/or movements of the weld stations 612-624 relative to the tool apparatus 600. In various embodiments, therefore, this may allow a single operator or user, such as the operator 650, to perform operations on a plurality of and/or plurality of types of work pieces in a workflow without requiring substantial reconfiguration of the tool apparatus 600. For efficiency, the C-frames 300 may be rearranged by operation of movement of the C-frames 300 as discussed above and/or the weld stations may be selectively chosen in a selected series or sequence to achieve the different configurations. Different tools may, based on the specific workpiece 70, be installed in the punch stations for the selected operation. Further it is understood that the tool apparatus 600 may include a single one of the punch stations, a single one of the weld stations, and/or the C-frames 44, 300 as discussed above. The various portions may be interchangeable as is understood by one skilled in the art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors (also referred to as processor modules), such as one or more digital signal processors (DSPs), general purpose microprocessors, graphic processing units (GPUs), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A machine apparatus for working on a workpiece, comprising:
   a tool mounting frame;
   a workpiece table configured to hold the workpiece relative to the tool mounting frame;
   a positioning assembly fixed to a base and to (i) engage the tool mounting frame, (ii) operable to move the tool mounting frame to a selected position relative to the workpiece table and the base, and (iii) hold the tool mounting frame at the selected position relative to the workpiece table;
   wherein the positioning assembly is operable to move the tool mounting frame between at least a first position and a second position relative to the workpiece table;
   wherein the first position is different than the second position relative to the base.

2. The machine apparatus of claim 1, further comprising:
   a workpiece table fixture configured to hold the workpiece table in a selected position;
   wherein the first position is different than the second position relative to the workpiece table fixture.

3. The machine apparatus of claim 1, further comprising:
   a frame assembly;
   wherein the base is mounted within the frame assembly;
   wherein the positioning assembly is fixed to the base within the frame assembly;

wherein the first position is different than the second position relative to the base.

4. The machine apparatus of claim 3, further comprising:
   a punch;
   wherein the punch is moved with the tool mounting frame.

5. The machine apparatus of claim 4, further comprising:
   a welding tool cartridge;
   a first welding tool fixed to the welding tool cartridge;
   a second welding tool fixed to the welding tool cartridge;
   wherein the first position is different than the second position relative to the welding tool cartridge;
   wherein the first position or the second position is based on a position of the first welding tool relative to the second welding tool.

6. The machine apparatus of claim 5, further comprising:
   wherein the welding tool cartridge includes a first welding tool cartridge and a second welding tool cartridge;
   wherein the first welding tool cartridge and the second welding tool cartridge are selectively and separately positioned relative to the base;
   wherein the first position is selected based on the first welding tool cartridge and the second position is selected based on the second welding tool cartridge.

7. The machine apparatus of claim 1, further comprising:
   a plurality of welding tool cartridges, wherein each welding tool cartridge of the plurality of welding tool cartridges include:
      a first welding tool fixed to the welding tool cartridge;
      a second welding tool fixed to the welding tool cartridge;
   a plurality of punch stations, wherein each punch station includes a plurality of the tool mounting frames, wherein each tool mounting frame is moveable relative to the workpiece; and
   a robot configured to move the workpiece between at least one of the welding tool cartridges and at least one of the punch stations.

8. The machine apparatus of claim 1, wherein the positioning assembly is connected to the tool mounting frame to engage the tool mounting frame.

9. The machine apparatus of claim 1, wherein the positioning assembly is connected to the tool mounting frame to engage the tool mounting frame;
   wherein the tool mounting frame includes a plurality of tool mounting frames and the positioning assembly includes a plurality of positioning assemblies;
   wherein one of the positioning assemblies is connected to one of the tool mounting frames.

10. The machine apparatus of claim 1, wherein the positioning assembly includes a plurality of motors.

11. A machine apparatus for working on a workpiece, comprising:
   a frame assembly;
   a base mounted within the frame assembly;
   a tool mounting frame;
   a tool held and positioned by the tool mounting frame;
   a workpiece holding table moveably fixed within the frame configured to hold a workpiece relative to the tool mounting frame; and
   a positioning assembly to (i) engage the tool mounting frame, (ii) move the tool mounting frame to a selected position relative to the base, and (iii) hold the tool mounting frame at the selected position relative to the base;
   a first welding tool cartridge having a first tool fixed to the first welding tool cartridge in a first configuration; and a second welding tool cartridge having a second welding tool fixed to the second welding tool cartridge in a second configuration;

wherein the positioning assembly is fixed to the base within the frame assembly;

wherein the positioning assembly is operable to move the tool mounting frame between at least a first position and a second position relative to the base;

wherein the first position is different than the second position;

wherein the first position or the second position is based on the first configuration or the second configuration.

12. The machine apparatus of claim 11, wherein the workpiece holding table is configured to hold a bumper fascia relative to the tool mounting frame and the tool is configured to perform work on the bumper fascia.

13. The machine apparatus of claim 11, wherein the first welding tool of the first welding tool cartridge includes a first plurality of welding tools fixed to the first welding tool cartridge in the first configuration;

wherein the second welding tool of the second welding tool cartridge includes a second plurality of welding tools fixed to the second welding tool cartridge in the second configuration;

wherein the base includes a cartridge receiving portion to receive both the first welding tool cartridge and the second welding tool cartridge;

wherein the first position is different than the second position relative to the cartridge receiving portion.

14. The machine apparatus of claim 13, further comprising:

a processor assembly configured to execute instructions to move the tool mounting frame to the first position or the second position based on whether the first welding tool cartridge or the second welding tool cartridge is in the cartridge receiving portion.

15. The machine apparatus of claim 13, wherein the tool mounting frame includes a first tool mounting frame and a second tool mounting frame;

wherein the first position includes a first relative position of the first tool mounting frame relative to the second a tool mounting frame;

wherein the second position includes a second relative position of the first tool mounting frame relative to the second tool mounting frame;

wherein the first tool mounting frame and the second tool mounting frame are included with a single one of the frame assembly.

16. A machine apparatus for working on a workpiece, comprising:

a tool mounting frame;

a workpiece table configured to hold a workpiece relative to the tool mounting frame;

a positioning assembly configured to (i) move the tool mounting frame to a selected position relative to the workpiece holding table and (ii) hold the tool mounting frame relative to the workpiece holding table;

a frame assembly;

a base mounted within the frame assembly;

wherein the positioning assembly is operable to move the tool mounting frame at a first position and a second position relative to the workpiece holding table;

wherein the first position is different than the second position;

wherein the positioning assembly is fixed to the base within the frame assembly;

wherein the positioning assembly is configured to move the tool mounting frame relative to the base;

wherein the first position is different than the second position relative to the base.

17. The machine apparatus of claim 16, wherein the positioning assembly is connected to the tool mounting frame.

18. The machine apparatus of claim 16, wherein the positioning assembly includes a plurality of motors.

19. A machine apparatus for working on a workpiece, comprising:

a frame assembly;

a base mounted within the frame assembly;

a tool mounting frame;

a tool held and positioned by the tool mounting frame;

a workpiece holding table moveably fixed within the frame configured to hold a workpiece relative to the tool mounting frame;

a positioning assembly configured to (i) move the tool mounting frame to a selected position relative to the base and (ii) hold the tool mounting frame relative to the base;

a first welding tool cartridge having a first welding tool and a second welding tool fixed to the first welding tool cartridge in a first configuration; and a second welding tool cartridge having a third welding tool and a fourth welding tool fixed to the second welding tool cartridge in a second configuration;

wherein the positioning assembly is fixed to the base within the frame assembly;

wherein the positioning assembly is operable to move the tool mounting frame at a first position and a second position relative to the base;

wherein the first position is different than the second position;

wherein the base includes a cartridge receiving portion to receive both the first welding tool cartridge and the second welding tool cartridge;

wherein the first position is different than the second position relative to the cartridge receiving portion;

wherein the first position or the second position is based on the first configuration or the second configuration.

20. The machine apparatus of claim 19, wherein the positioning assembly is connected to the tool mounting frame.

21. The machine apparatus of claim 19, wherein the positioning assembly is operable to move the tool mounting frame in at least three axes.

* * * * *